(12) United States Patent
Burman et al.

(10) Patent No.: US 10,817,492 B2
(45) Date of Patent: Oct. 27, 2020

(54) APPLICATION EXTENSION

(71) Applicant: ServiceNow, Inc., Santa Clara, CA (US)

(72) Inventors: Jacob Samuel Burman, Savage, MN (US); Michael Alan Jones, Glen Carbon, IL (US)

(73) Assignee: ServiceNow, Inc., Santa Clara, CA (US)

( * ) Notice: Subject to any disclaimer, the term of this patent is extended or adjusted under 35 U.S.C. 154(b) by 323 days.

(21) Appl. No.: 15/588,101

(22) Filed: May 5, 2017

(65) Prior Publication Data
US 2018/0321820 A1 Nov. 8, 2018

(51) Int. Cl.
*G06F 16/22* (2019.01)

(52) U.S. Cl.
CPC .................. *G06F 16/2282* (2019.01)

(58) Field of Classification Search
None
See application file for complete search history.

(56) References Cited

U.S. PATENT DOCUMENTS

| | | | |
|---|---|---|---|
| 5,446,575 A * | 8/1995 | Lysakowski, Jr. .... | G06F 16/258 |
| 6,321,229 B1 | 11/2001 | Goldman | |
| 6,678,887 B1 | 1/2004 | Hallman | |
| 7,020,706 B2 | 3/2006 | Cates | |
| 7,603,657 B2 * | 10/2009 | Gassner .................... | G06F 9/06 |
| | | | 717/113 |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |

(Continued)

FOREIGN PATENT DOCUMENTS

| | | | | |
|---|---|---|---|---|
| EP | 2 523 134 A1 * | 11/2012 | ............. | G06F 19/00 |
| EP | 2523134 A1 * | 11/2012 | ............. | G16H 10/40 |

OTHER PUBLICATIONS

PHPenthusiast, "Inheritance in object-oriented PHP", 2016, Published at https://phpenthusiast.com/object-oriented-php-tutorials/inheritance-in-object-oriented-php (Year: 2016).*

(Continued)

*Primary Examiner* — Hossain M Morshed
(74) *Attorney, Agent, or Firm* — Fletcher Yoder PC

(57) ABSTRACT

Systems and methods are disclosed for providing customized applications from platform software using application extension. For example, methods may include transmitting to a client device an application customization interface for presentation to a user; receiving one or more configuration commands from the client device, where the one or more configuration commands have been generated by the user using the application customization interface; based on the one or more configuration commands, generating a child application based on a parent application, where a configuration of the child application includes objects derived from the parent application via application extension; and invoking the child application using a platform instance to access customer data stored by the platform instance.

20 Claims, 13 Drawing Sheets

(56) References Cited

U.S. PATENT DOCUMENTS

| | | | |
|---|---|---|---|
| 8,516,383 B2* | 8/2013 | Bryant | G06F 3/0481 |
| | | | 715/763 |
| 8,612,408 B2 | 12/2013 | Trinon | |
| 8,646,093 B2 | 2/2014 | Myers | |
| 8,832,652 B2 | 9/2014 | Mueller | |
| 9,065,783 B2 | 6/2015 | Ding | |
| 9,071,623 B2* | 6/2015 | Arthursson | G06F 9/45504 |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,513,780 B2* | 12/2016 | Scott | G06F 3/0484 |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 9,973,569 B2* | 5/2018 | Parashar | H04L 67/10 |
| 10,209,879 B2* | 2/2019 | Fleizach | H04M 19/04 |
| 2002/0049603 A1* | 4/2002 | Mehra | G06F 9/465 |
| | | | 726/3 |
| 2002/0049749 A1* | 4/2002 | Helgeson | G06F 21/6236 |
| | | | 709/203 |
| 2006/0106775 A1* | 5/2006 | Kuhn | G06F 40/117 |
| 2007/0245318 A1* | 10/2007 | Goetz | A61N 1/36071 |
| | | | 717/135 |
| 2007/0250833 A1* | 10/2007 | Araujo, Jr. | G06F 21/6218 |
| | | | 718/1 |
| 2007/0250839 A1* | 10/2007 | Van Der Sanden | G06F 9/54 |
| | | | 719/315 |
| 2007/0250840 A1* | 10/2007 | Coker | G06F 9/54 |
| | | | 719/320 |
| 2007/0261048 A1* | 11/2007 | Bernabeu-Auban | |
| | | | G06F 9/44505 |
| | | | 717/170 |
| 2009/0007160 A1* | 1/2009 | Wei | G06F 8/41 |
| | | | 719/328 |
| 2009/0249295 A1* | 10/2009 | Poole | G06Q 10/06 |
| | | | 717/120 |
| 2010/0122313 A1* | 5/2010 | Ivgi | G06F 21/6218 |
| | | | 726/1 |
| 2017/0109178 A1* | 4/2017 | Chen | G06Q 40/025 |
| 2017/0237682 A1* | 8/2017 | Xue | G06F 9/5038 |
| | | | 709/226 |
| 2018/0321820 A1* | 11/2018 | Burman | G06F 16/2282 |

OTHER PUBLICATIONS

StackOverflow "Copying the contents of a base class from a derived class", 2013, Published at https://stackoverflow.com/questions/14613919/copying-the-contents-of-a-base-class-from-a-derived-class (Year: 2013).*

PC Magazine-Version, "Encyclopedia", 2019, Published at "https://www.pcmag.com/encyclopedia/term/53749/version" (Year: 2019).*

ComputerHope, "What is a version", 2018, Published at https://www.computerhope.com/jargon/v/version.htm (Year: 2018).*

Passant, "Is it possible to have same app running in multiple application domains in parallel?" Stack Overflow, 2010, https://stackoverflow.com/questions/4047015/is-it-possible-to-have-same-app-running-in-multiple-application-domains-in-paral (Year: 2010).*

Passant, StackOverflow, 2010, Published by StackOverflow at https://stackoverflow.com/questions/4047015/is-it-possible-to-have-same-app-running-in-multiple-application-domains-in-paral (Year: 2011).*

ServiceNow, Product Documentation, "Use Table Extension", Date Unknown, Downloaded May 3, 2017, https://docs.servicenow.com/bundle/istanbul-servicenow-platform/page/administer/platform-performance/task/t_TableExtensionExample.html, 5 pp.

ServiceNow, Developers, "Extending Tables", Date Unknown, Downloaded May 3, 2017, https://developer.servicenow.com/app.do#!/training/article/app_store_learn_dev_platform_intro_helsinki_c_Mod7WorkWithForms/app_store_learn_dev_platform_intro_helsinki_c_ExtendingTables?v=helsinki, 3 pp.

* cited by examiner

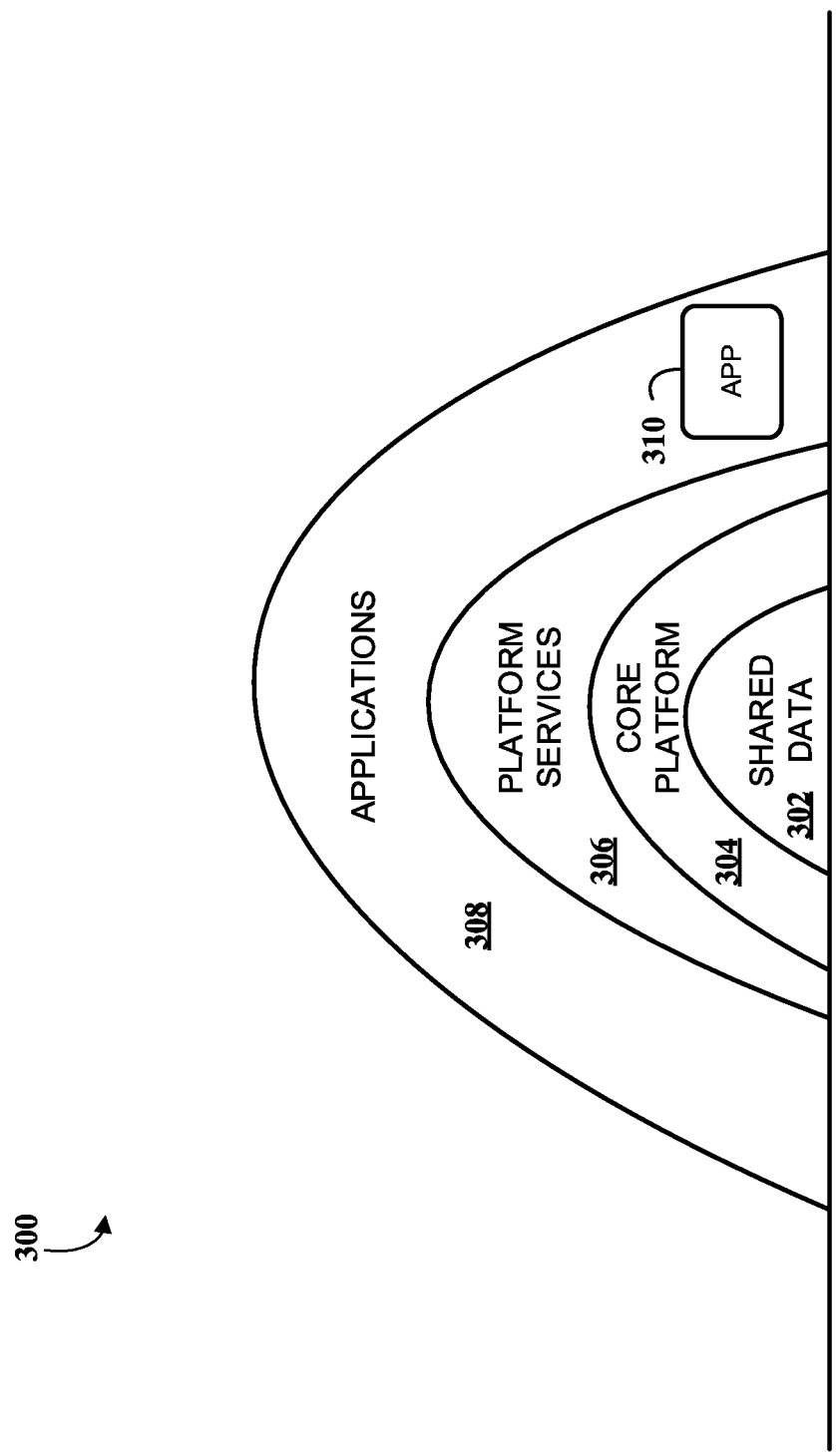

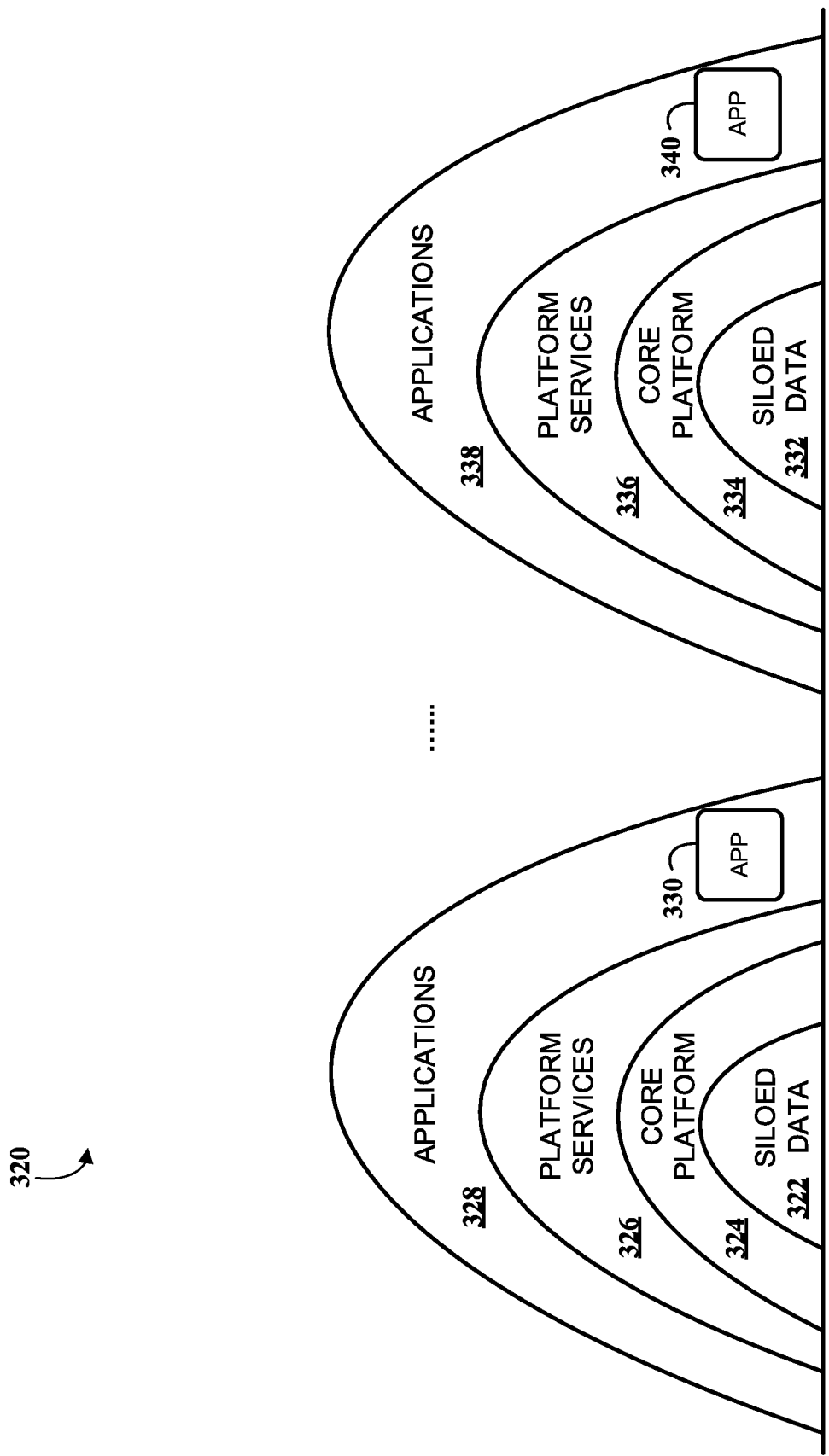

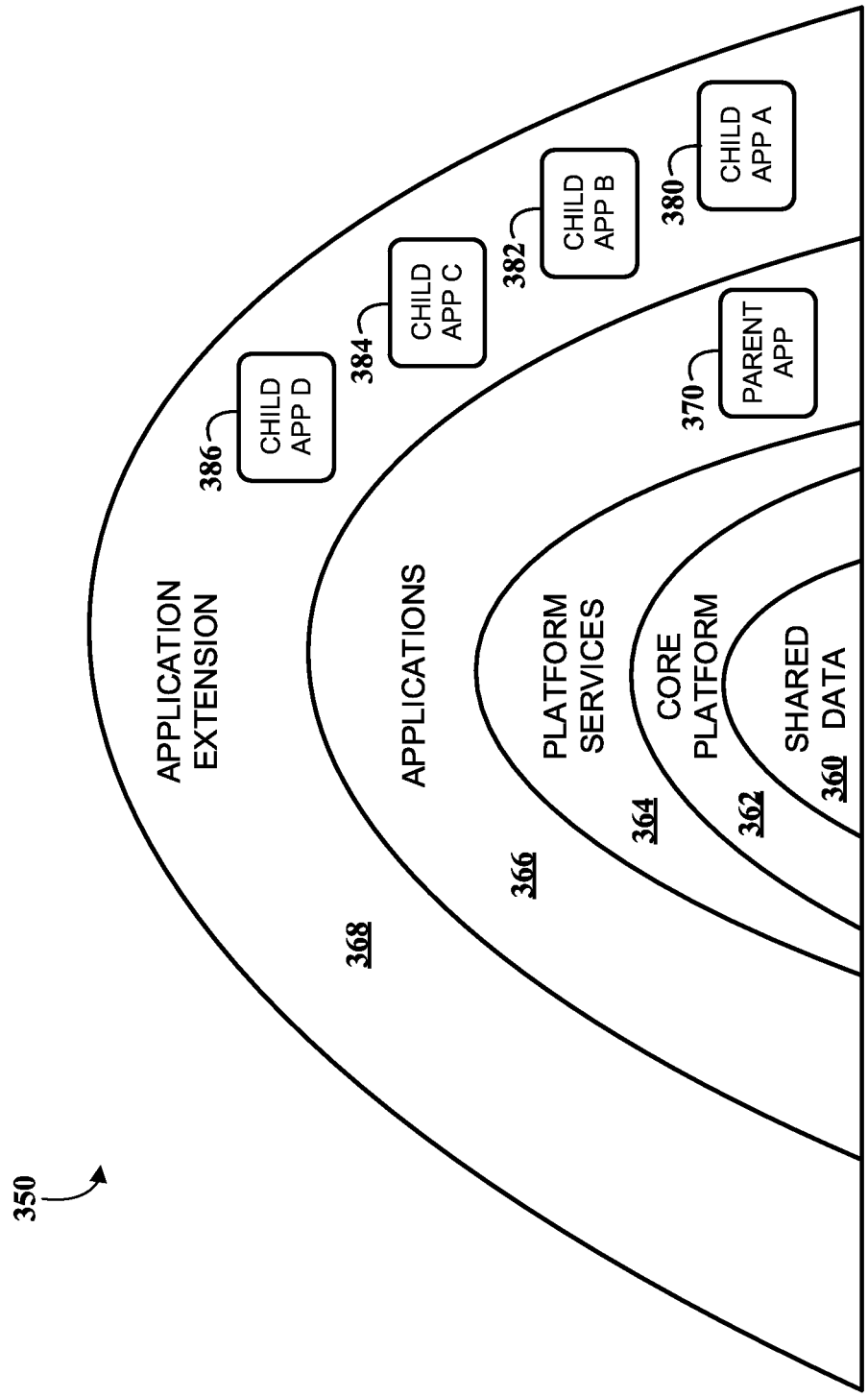

APPLICATION EXTENSION

BACKGROUND

Computing networks can be large and complex, consisting of many thousands of hardware and software components. Maintaining and operating a large network can present many challenges. One challenge is servicing the needs of many diverse constituencies within a large organization. Different subgroups may have different processes and may have different schedules for operating and upgrading software.

SUMMARY

Disclosed herein are implementations of application extension.

In an implementation, a system is provided that is operable to provide software services. The system may include a memory and a processor. The memory includes instructions executable by the processor to cause the system to transmit to a client device an application customization interface for presentation to a user; receive one or more configuration commands from the client device, where the one or more configuration commands have been generated by the user using the application customization interface; based on the one or more configuration commands, generate a child application based on a parent application, where a configuration of the child application includes objects derived from the parent application via extension; and invoke the child application using a platform instance to access customer data stored by the platform instance.

In an implementation, a method is provided for providing software services. The method may include transmitting to a client device an application customization interface for presentation to a user; receiving one or more configuration commands from the client device, where the one or more configuration commands have been generated by the user using the application customization interface; based on the one or more configuration commands, generating a child application based on a parent application, where a configuration of the child application includes objects derived from the parent application via extension; and invoking the child application using a platform instance to access customer data stored by the platform instance.

In an implementation, a system is provided that is operable to provide software services. The system may include a memory and a processor. The memory includes instructions executable by the processor to cause the system to receive one or more configuration commands from a client device to extend a parent application included in an instance of platform software, wherein the parent application includes a parent configuration that defines operation of the parent application when invoked using the platform software; based on the one or more configuration commands, generate a child application extending the parent application, wherein the child application includes a child configuration and wherein the child application uses both the parent configuration and the child configuration; generate a user interface to transmit to the client device using at least some of the parent configuration and at least some of the child configuration; and receive data from the client device generated using the user interface.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 3A is a diagram of an implementation of a system usable for providing software services with a platform instance.

FIG. 3B is a diagram of an implementation of a system usable for providing software services with multiple platform instances.

FIG. 3C is a diagram of an implementation of a system usable for providing software services with a platform instance using application extension.

DETAILED DESCRIPTION

Figure 1:
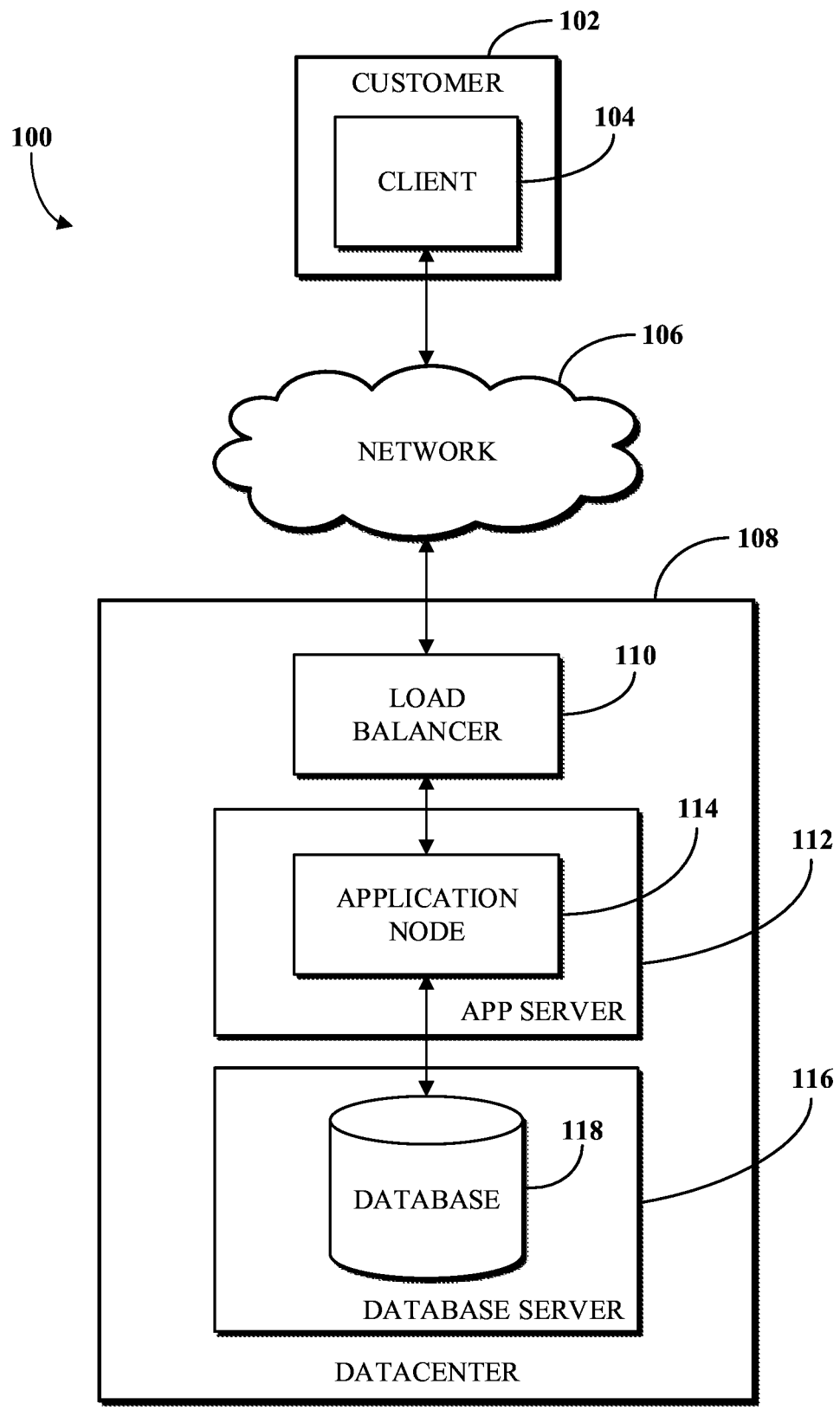
FIG. 1 is a diagram of an example of an electronic computing and communications system.

This document includes disclosure of systems, apparatus, and methods for providing software services that may be managed by an external service provider (e.g., a software-as-a-service provider). For example, the software services may be provided to private network (e.g., a firewalled or otherwise secured network) controlled by a customer. In other implementations, the platform software may be implemented as on-premises software, such as in the private network, and may be administered by the customer instead of an external service provider. A software service provider may provide software services to one or more customers by providing access to platform software running on one or more application servers to implement these software services. An implementation approach using application extension is described that may preserve the flexibility of platform software provided for a customer, and inherent speed-to-market benefits, even when future scope of the implementation for the customer is unknown. This approach may enable multiple groups, business units, departments, and/or regions to leverage the same instance of platform software (i.e., a platform instance); maintain process deviations and configurations across user populations in a controlled way; provide data and administration segregation where necessary; and to preserve shared data and process benefits where appropriate.

As used in this document, "application extension" refers to a technique for generating a child application, where the child application is derived at least in part from a parent application.

Many customers of a software service provider initially adopt the software service provider's platform to address the service and management needs of a single sub-organization or business unit (e.g., an information technology group) within a larger organization, though other sub-organizations (e.g., a facilities group, a manufacturing group, or a human resource group) may have similar requirements. This is true, for example, of human resources first, information technology first and other budget holder first implementations. Implementations of a software service provider's platform solutions, like customer projects, may, for example, simply follow budget availability. The result of an information technology first implementation, for example, is typically a platform instance including applications configured specifically for information technology. When additional business units or departments begin to leverage the software service provider's platform, rework necessary to accommodate their requirements may erode the initial time-to-value benefits the software service provider's platform can provide. In order to extend the use of the platform and achieve a quick turn-around, implementation of new use cases for the business may include adding additional categories or other configuration to an existing application (e.g., an incident management application). The result may be an over configured, hard to maintain and hard to upgrade application that does not conform with implementation best practices. Alternatively, an entirely new instance may be created to host applications configured for the different use cases. However, this approach has the limitation of data being distributed across multiple instances which can result in difficulties in administration, maintenance, usability, and reporting.

A solution to this problem is that sub-organizations or business units can isolate their respective configurations for an application and effectively run separate applications (e.g., an information technology change management application and a manufacturing change management application) on the basis of the same base or parent application within a single platform instance that services the larger customer organization. The separation of various configurations for an application may be achieved using extension to generate child applications with configurations based on the configuration of a parent application (e.g., an out-of-box application with a best practice configuration). This application extension approach may enable additional use case adoption and may allow for true enterprise service management realization.

A software service provider may implement an object oriented architecture for the applications of their platform software to enable application extension. As such, applications may be extended (e.g., via table extensions where application configurations are stored in extensible tables), which may effectively create a copy of the provided parent application. The extended application may be tailored/configured for the unique use case leaving the out-of-box application pristine (unchanged). Additional extensions/copies may be made, allowing for additional use cases using the same application within a single platform instance for a customer. This application extension approach may be leveraged to further extend applications, so that a customer may setup the same application multiple times (e.g., for different sub-organizations) within the same platform instance. Application scoping may be used to provide a security layer between applications. The application extension approach to application customization may be recommended for large customers as a new best practice.

This application extension approach can be used in combination with other techniques, such as domain separation. Domain separation is designed for multitenancy and data segregation of multiple legal entities. Domain separation allows multiple tenants to exist in one platform instance without being able to see or damage each other. Data separation may ensure that tenants only see data that they are privileged to see. Domain separation uses a folder-based approach. Application extension uses an object-oriented approach that may be used for configuration separation, allowing for multiple use cases to be deployed within the same platform instance. Application extension and domain separation may be combined to provide the ability for the creation of applications using application extension separately for multiple tenants or legal entities within a domain separated instance.

This application extension approach may provide numerous benefits and advantages, including, for example: leveraging parent application business rules, forms, views, and/or configuration; enabling process deviation or process isolation; allowing for department specific data, without over complicating another departments user and work experience; allowing for data segregation (e.g., for reporting, viewing, security); allowing for reporting of all derived objects (e.g., a parent may report on all child objects); enabling tailored configuration of a process/application/configuration, without impacting a customer's company standard configuration; isolates configuration from out-of-box provided platform applications; allowing for application scoping, enabling additional security controls for administrators and users; and allowing for configuration portability across instances. The application extension approach uses platform application definitions to track configuration objects. In some implementations, the entire configuration may be exported for configuration migration, or deleted to safely remove an entire configuration. This configuration export feature may provide an added advantage for divestitures, for configuration portability to a new instance, or for removal of no longer needed functionality.

An application may have an application scope that determines which of its resources are available to other parts of the system. Application scoping may prevent one application from impacting another application. A user (e.g., an administrator) can specify what parts of the application that other applications can access, by setting application access settings. Private scope: applications in a private application scope restrict access to their application artifacts so that only application artifacts in the same scope have full access to create, modify, remove, or run application data. An application developer may set what parts of an application are accessible from other application scopes with application access settings. Global scope: applications in the global scope are like shared resources that any application developer can modify. Global scope applications do not have a unique namespace identifier included in their application artifact names, but they can have their own application access permissions. Typically, applications provided by a software service provider out-of-box are in the global scope, however some custom applications may also be in the global scope.

Application templates programmatically extend other platform applications and tables, to create a new application. This may include configuration components such as tables, roles, access controls, knowledge bases, navigation menus and a content management system (CMS) site.

Implementations of this disclosure provide technological improvements particular to computer networks, for example, the provision of software services to a private network from outside of the private network may be improved. Computer network-specific technological problems, such as customizing applications for a variety of use cases within a large organization. For example, multiple independent configurations of an application of a platform instance may be generated and configured using application extension. Implementations of this disclosure can thus introduce new and efficient improvements in the ways in applications are customized and maintained to the serve multiple different subgroups while maintaining shared access to customer data for the larger organization.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. The system 100 can include any number of customers and/or clients and/or can have a configuration of customers and/or clients different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can comprise a plurality of configuration items (CIs). A CI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the current database 118), tables, other suitable information sources, and/or portions or combinations thereof can be stored, managed, or otherwise provided by one or more of the elements of the system 100 other than the database server 116, such as the client 104 and/or the application server 112.

Some or all of the systems and techniques described herein can operate and/or be executed on or by the servers associated with the system 100. For example, a user may use the customer 102 to transmit configuration commands to the application server 112 to cause platform software of the application node 114 to generate and configure a child application based on a parent application using application extension, and the database 118 may be updated to store a configuration for the child application (e.g., stored with private scope). In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation;

an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
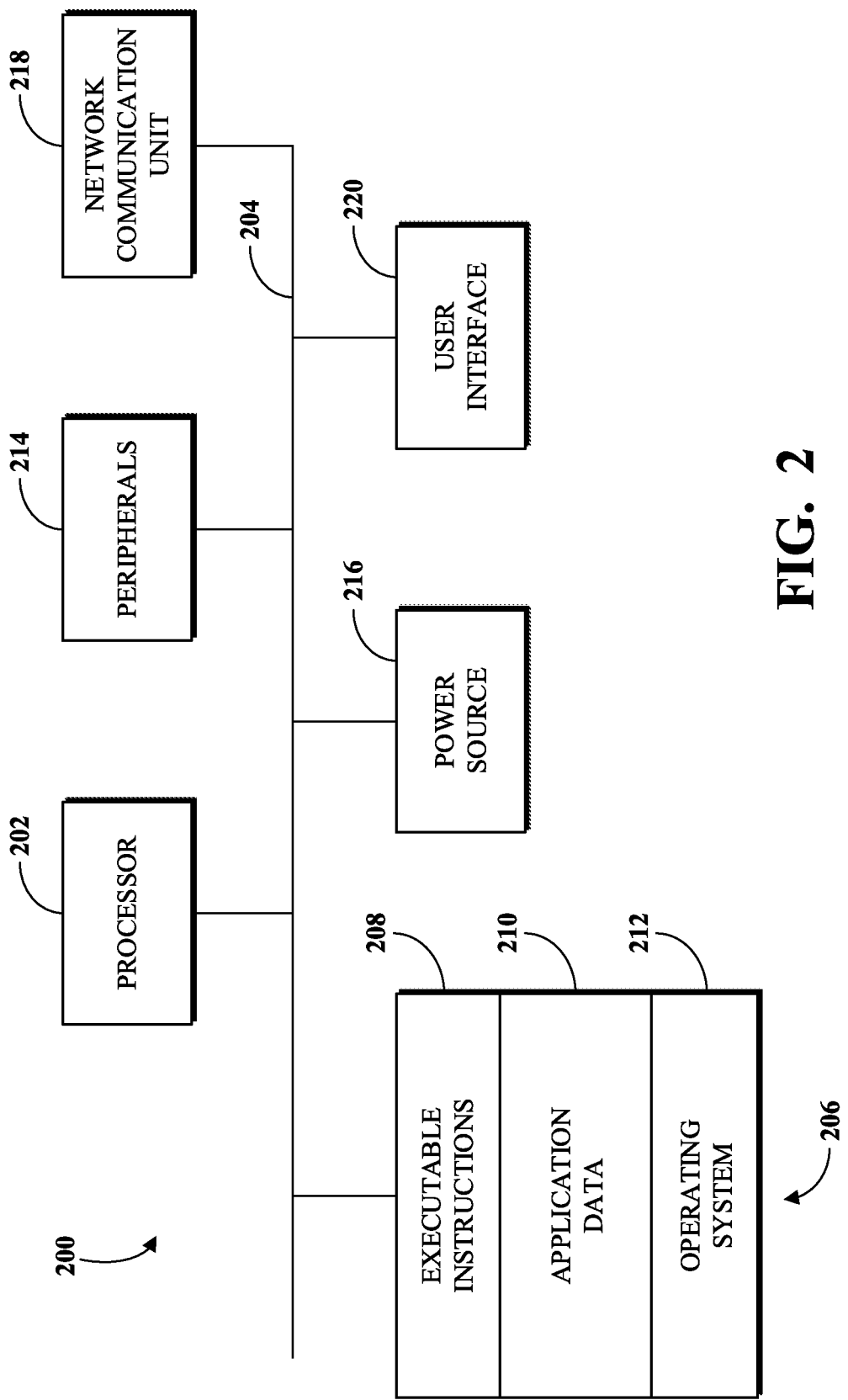
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions. The operations of the processor 202 can be distributed across multiple machines, which can be coupled directly or across a local area or other type of network.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage. The memory 206 can be distributed across multiple machines, such as network-based memory or memory in multiple machines performing the operations of clients and/or servers.

The memory 206 can include executable instructions 208; data, such as application data 210; an operating system 212; or a combination thereof for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to transmit to a client device an application customization interface for presentation to a user; receive one or more configuration commands from the client device, where the one or more configuration commands have been generated by the user using the application customization interface; based on the one or more configuration commands, generate a child application based on a parent application, where a configuration of the child application includes objects derived from the parent application via application extension; and invoke the child application using a platform instance to access customer data stored by the platform instance.

The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client and/or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204. Although depicted here as a single bus, the bus 204 can be composed of multiple buses, which can be connected to one another through various bridges, controllers, and/or adapters.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

FIG. 3A is a diagram of an implementation of a platform instance 300 usable for providing software services to customer (e.g., the customer 102). The platform instance 300 includes shared data 302 stored for the customer and core platform software 304 that provides an application programming interface (API) for accessing and managing the shared data 302. The platform instance 300 includes platform services software 306 that utilizes core platform software 304 to provide value added services and an API for those services. The platform instance 300 includes applications 308 that can be more easily configured to provide access to shared data 302 and services (e.g., through a web interface). The applications 308 include an application 310 that is configured to provide a set functions (e.g., a change management application) through a user interface.

The platform instance 300 may be initially deployed to serve a single group or business unit (e.g., an information technology group) within a larger organization of a customer. When additional business units or departments (e.g., a facilities group and/or a manufacturing group) begin to leverage platform instance 300 and the application 310, rework necessary to accommodate their requirements may erode the initial time-to-value benefits the platform instance 300 can provide. In order to extend the use of platform instance 300 and achieve a quick turnaround, implementation of new use cases for the business often starts with adding additional categories or other configuration to the existing application 310 (e.g., a change management application). The result can be an over-configured, hard to maintain and hard to upgrade application 310, far from the out-of-box best practices.

As the number of use cases for the application 310 increase a number of problems arise for the platform instance 300, including: requirements may now need to be prioritized among the various use cases and user groups; upgrade issues may result from workflow and rule customization; and upgrade complexity may be increased by increased regression testing.

FIG. 3B is a diagram of an implementation of a system 320 usable for providing software services with multiple platform instances. For example, separate platform instances for each group within a larger organization that can be independently customized for the use case(s) of the respective groups. The system 320 includes multiple platform instances with multiple collections of siloed data (e.g., 322 and 332) for the various groups. The platform instances of the system 320 include copies of core platform software (e.g., 324 and 334), platform services software (e.g., 326 and 336), and applications (e.g., 328 and 338). The applications (e.g., 328 and 338) include respective copies of an application (e.g., 330 and 340) that can be independently customized for the use case(s) of their respective groups (e.g., an information technology group and a manufacturing group). However, these groups no longer enjoy the substantial benefits of sharing a single system of record for the larger organization they are part of.

FIG. 3C is a diagram of an implementation of a platform instance 350 usable for providing software services using application extension. For example, the platform instance 350 may be implemented by the application node 114 and the database node 118 to provide software services to the customer 102. The platform instance 350 includes shared data 360 (e.g., stored using database node 118) stored for the customer and core platform software 362 (e.g., executed by application node 114) that provides an application programming interface (API) for accessing and managing the shared data 360. The platform instance 350 includes platform services software 364 that utilizes core platform software 362 (e.g., stored using database node 118 and executed using core platform software 362) to provide value added services and an API for those services. The platform instance 350 includes applications 366 that can be configured to provide access to shared data 360 and services (e.g., through a web interface). The applications 366 include a parent application 370 that is configured to provide a set functions (e.g., a change management application) through a user interface. The platform instance 350 also includes application extension 368, which enables applications 366, such as the parent application 370, to be extended to multiple child applications (child application A 380, child application B 382, child application C 384, and child application D 386) to address a plurality of different use cases without complicating or otherwise corrupting the parent application 370. In fact, the parent application may be left in a pristine out-of-box state while the child applications (380, 382, 384, and 386 are customized to address their respective use cases for respective different groups (e.g., an information technology group, a facilities group, a human resources group, and a manufacturing group) within a customer organization. For example, applications 370, 380, 382, 384, and 386 may be stored using database node 118 and may be executed using core platform software 362, platform services software 364, and application node 114.

Using the platform instance 350 with application extension 368 enables extension of out-of-box applications (e.g., Change Management, Asset Management, etc.) for each group or business unit. Child applications (e.g., 380, 382, 384, and 386) may be further extend for departmental or regional process deviations when appropriate. Child applications (e.g., 380, 382, 384, and 386) may be scoped for security control, enabling strict security enforcement across use cases of the platform instance 350. In some implementations, an unchanged global scope may be maintained, which includes out-of-box functionality and configuration, where only true global/shared configuration across the entire platform instance 350 is configured in the global scope. Master data and core data may be standardized for items shared across the organization in the global scope, but application extension may be leveraged to leave multi-use applications/objects/modules with out-of-box state, to support a known configuration start point for future use case adoption.

By extending existing applications, custom development of functionality provided out-of-box is discouraged. For example, treating an information technology group as a business unit, where information technology's use of an information technology service automation (ITSA) suite is performed and managed from scoped/extended versions of the ITSA applications, thereby enabling other groups or business units to leverage the same unaltered applications of the platform instance 350 for additional use cases. Some examples of child applications extended from parent applications to address respective uses cases are listed in Table 1 below.

TABLE 1

| Parent Application | Extended Child Application | |
|---|---|---|
| Incident Management | IT Incident | Configured with ITIL best practices |
| | Manufacturing Incident | Configured to support manufacturing Issues |
| | Safety Incident | Configured for personnel safety events and issues |
| | Global Business Services Incident | Configured for business incidents from a shared services center, supporting non-IT issues, and regional specific incidents |
| Contract Management | Asset Contract | Configured for computer and equipment tracking |
| | IT Asset | Configured for compute devices and peripherals |
| | Market Measures | Configured for market data acquisition and vendor contracts |
| Change Management | IT Change Management | Configured for ITIL best practice Extended further deriving from the IT standard, but with Region specific controls Additional control, approval or component that's used by a subset of users |
| | Manufacturing Change Management | Configured for machine changes such as parts replacement or upgrades |
| | Validated Change Management | Secured and audited to ensure full traceability of controlled configuration updates to the system |
| Customer Service Management | Retail Customer Service | Configured for external retail customers |
| | Pharmacy Customer Service | Secured and audited to ensure full traceability of pharmaceutical based customer calls, with integration to dispense systems |
| | Manufacturing Customer Service | Configured with integration into manufacturing product catalog |

An application may be extended into multiple versions of itself, which may be useful for business unit, region specific or department specific process deviations. The same platform application may be used multiple times, deriving from the parent configuration. In some implementations, multiple layers or derivatives of application extension may be permitted (e.g., so that a child application may be derived from another child application). For example, a second child application may be generated based on a first child application, where a configuration of the second child application includes objects derived from the first child application and from a parent application of the first child application via application extension. Each child version of an application may be extended with additional fields, new business rules and new configuration that is specific to the child. Coupled with application scoping, the application extension model may offer secure controls over record and application access. This is especially important for regulated environments or to limit access to highly sensitive data. Extending out-of-box applications, or leveraging application templates, may allow business units or departments to operate in their own working application space. Security controls and configuration may be tailored for each group as appropriate.

Figure 4:
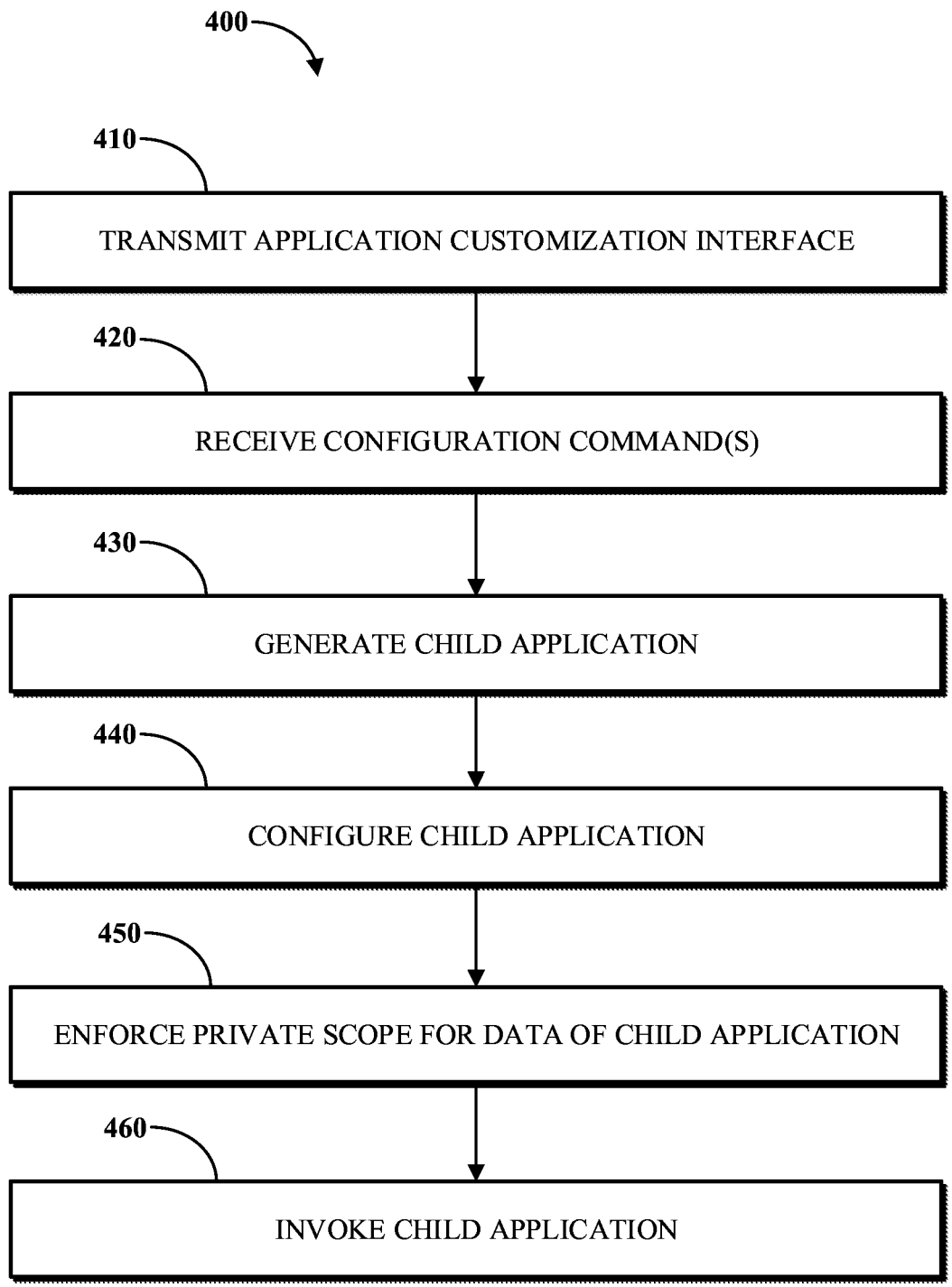
FIG. 4 is a logic flowchart illustrating an example of a technique for providing software services with a platform instance using application extension.

FIG. 4 is a flowchart illustrating an example of a technique 400 for providing software services with a platform instance using application extension in an electronic computing and communications system, such as the system 100 as generally illustrated in FIG. 1. In some implementations, the technique 400 can be executed using computing devices, such as the systems, modules, and devices described with respect to FIGS. 1, 2, and 3A. In some implementations, the technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The example technique 400 includes transmitting 410 to a client device an application customization interface for presentation to a user; receiving 420 one or more configuration commands from the client device, where the one or more configuration commands have been generated by the user using the application customization interface; based on the one or more configuration commands, generating 430 a child application based on a parent application, where a configuration of the child application includes objects derived from the parent application via application extension; configuring 440 the child application; enforcing 450 private scope for data of the child application; and invoking 460 the child application using a platform instance to access customer data stored by the platform instance. For example, the technique 400 may be implemented by a platform instance (e.g., platform instance 350 of FIG. 3C) implemented using an application server (e.g., the application server 112) and database server (e.g., database server 116). In some implementations, the technique 400 may enable supporting multiple configurations of an application (e.g., the child applications 380, 382, 384, and 386) that can evolve independently to support multiple use cases within an organization while allowing users of these multiple configurations of the application to continue accessing the shared data (e.g., the shared data 360) of a platform instance.

The example technique 400 includes transmitting 410 an application customization interface. The application customization interface may be transmitted 410 to a client device (e.g., the client 104) for presentation to a user. The application customization interface may enable the user to generate configuration commands for an application provided by a platform instance (e.g., the platform instance 350), including one or more configuration commands for generating 430 a new child application based on a parent application using application extension. The application customization interface may also enable the user to generate configuration commands for further configuring 440 a child application. For example, the application customization interface may include the example display region 710 of FIG. 7. For example, the application customization interface may be transmitted 410 by the platform instance 350 of FIG. 3C running on the application server 112 via a network interface (e.g., the network communication unit 218).

The example technique 400 includes receiving 420 one or more configuration commands from a client device (e.g., the client 104). The one or more configuration commands may have been generated by the user using the application customization interface. For example, the one or more configuration commands may identify a parent application (e.g., the parent application 370) and instruct a platform instance (e.g., the platform instance 350) to generate 430 a child application (e.g., child application A 380, child application B 382, child application C 384, and/or child application D 386) based on the parent application. For example, one or more configuration commands may be received 420 by a platform instance (e.g., the platform instance 350) running on an application server (e.g., the application server 112) from a client device (e.g., the client 104). For example, the one or more configuration commands may be received 420 using a network interface (e.g., the network communication unit 218).

The example technique 400 includes generating 430 a child application (e.g., child application A 380, child application B 382, child application C 384, or child application D 386). The child application may be generated 430 based on (e.g., responsive to) the one or more configuration commands received 420. The child application may be generated 430 based on a parent application (e.g., the parent application 370), where a configuration of the child application includes objects derived from the parent application via application extension. In some implementations, table extensions are used to implement application extension for applications of a platform instance. For example, the configuration may be stored in an extensible table in a database (e.g., the database 118). For example, a configuration of an application may include various types of data stored in objects (e.g., fields or columns of a table) for the application, such as integers, text, choices, references, business rules, user interface actions, workflow, logic, JavaScript, etc. When the child application is generated 430, objects of a configuration of the parent application are incorporated (e.g., by copying or by reference) into the configuration of the child application. In some implementations, generating 430 a child application includes setting an extended table attribute, the super_class, of the configuration object (or table) to an existing configuration object (or table) of the parent application. Additional objects (e.g., fields and/or application logic) specific to the child application may be added to the configuration of the child application. For example, a platform instance (e.g., the platform instance 350) running on an application server (e.g., the application server 112) may generate 430 the child application, including storing the configuration of the child application in a database of the platform instance (e.g., the database 118).

The example technique 400 includes configuring 440 the child application. For example, the configuration of the child application can be added or modified upon generation of the child application and/or afterwards in response to configuration commands for customizing the child application to suit a potentially evolving use case (e.g., a use case of a sub-organization within a larger organization of a customer). For example, the technique 500 of FIG. 5 may be implemented to configure 440 the child application (e.g., child application A 380, child application B 382, child application C 384, or child application D 386).

The example technique 400 includes enforcing 450 a private scope for data of the child application (e.g., child application A 380, child application B 382, child application C 384, or child application D 386). Enforcing 450 a private scope for a set of data of the child application may prevent the set of data from being accessed or modified by sibling applications that have been derived via application extension from the parent application of the child application. For example, the set of data may include the configuration of the child application. In some implementations, enforcing 450 the private scope for the set of data includes storing the set of data (e.g., the configuration) in a database of the platform instance, maintaining an access control list (ACL) for the set of data (e.g., the configuration), and utilizing the ACL to control access to the set of data (e.g., the configuration). For example, a platform instance (e.g., the platform instance 350) running on an application server (e.g., the application server 112) may enforce 450 a private scope for a set of data of the child application.

The example technique 400 includes invoking 460 a child application. For example, the child application may be invoked 460 using a platform instance to access customer data (e.g., the shared data 360) stored by the platform instance. In some implementations, the platform instance is a multi-tenant instance that segregates data for multiple customers using domain separation. For example, the child application may be invoked 460 by a platform instance (e.g., the platform instance 350) running on an application server (e.g., the application server 112) responsive to a request received by the platform instance from a client device (e.g., the client 104). The configuration of the child application may cause the child application to operate in a manner that is tailored to a use case (e.g., a use case for a sub-organization or business unit) when invoked 460 by the platform instance to access and process customer data.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, the technique 400 may be augmented to include exporting the configuration of a child application for use in a different platform instance. For example, a configuration of a child application may be exported in an Extensible Markup Language (XML) format. For example, a configuration of a child application may be exported to GITHUB via Source Control. Furthermore, one or more aspects of the systems and techniques described herein can be omitted. For example, transmitting 410 the application customization interface, configuring 440 the child application, and/or enforcing 450 private scope for data of a child application are operations that may be omitted.

Figure 5:
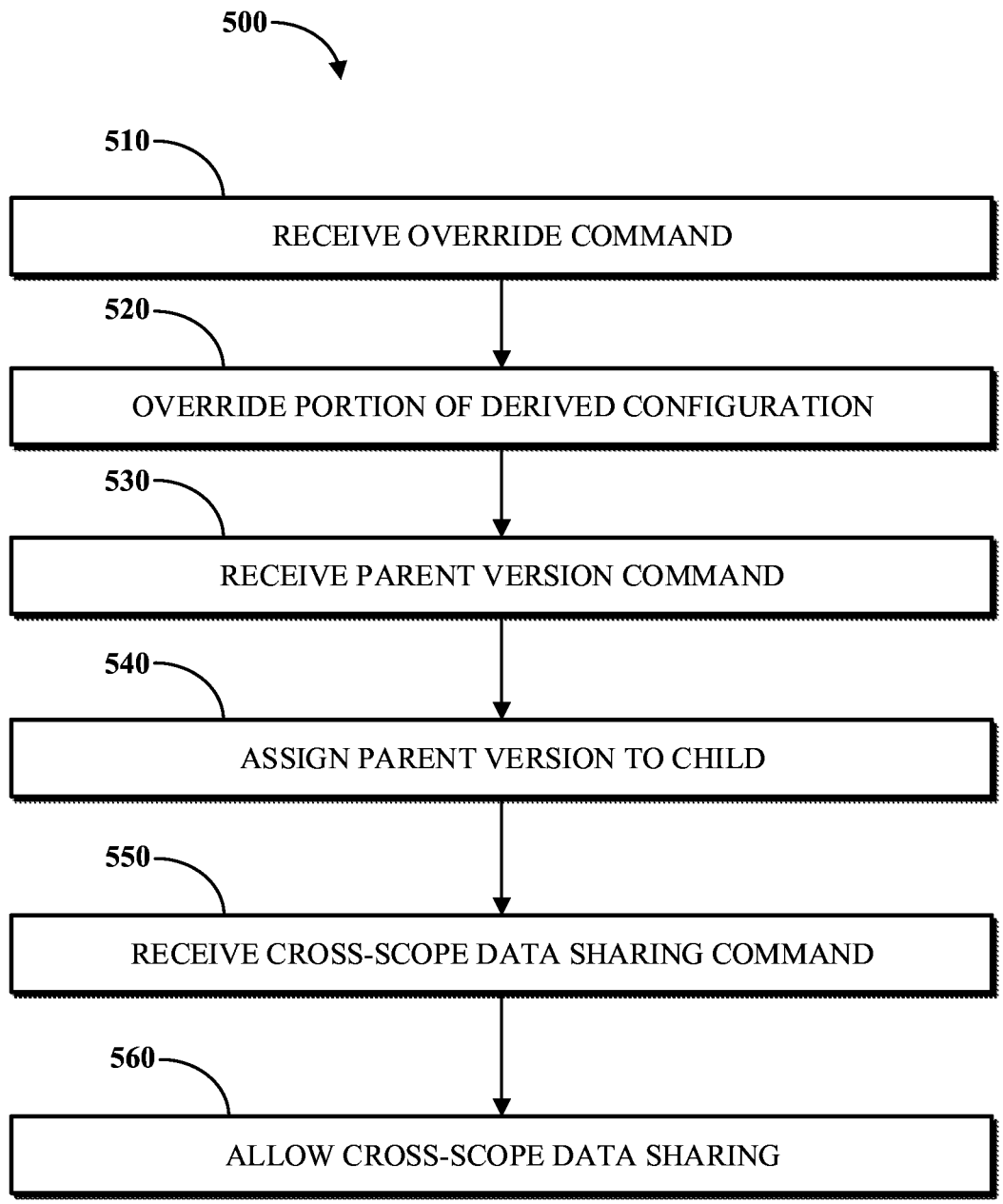
FIG. 5 is a logic flowchart illustrating an example of a technique for configuring a child application.

FIG. 5 is a flowchart illustrating an example of a technique 500 for configuring a child application in an electronic computing and communications system, such as the system 100 as generally illustrated in FIG. 1. In some implementations, the technique 500 can be executed using computing devices, such as the systems, modules, and devices described with respect to FIGS. 1, 2, and 3C. In some implementations, the technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

The example technique 500 includes receiving 510 an override command; responsive to the override command, overriding 520 a portion of the configuration that was derived from the parent application; receiving 530 a parent version command; responsive to the parent version command, assign 540 a version of the parent application to the child application such that, when the parent application is updated, changes to a configuration of the parent application are prevented from propagating to the configuration of the child application; receiving 550 a cross-scope data sharing command that specifies a second set of data of the child application; and allowing 560 the second set of data to be accessed by one or more of the sibling applications of the child application. For example, the technique 500 may be implemented by a platform instance (e.g., platform instance 350). In some implementations, the technique 500 may enable configuring an application to suit a use case of a subgroup of users (e.g., users associated with an operational unit within a larger organization, such as an information technology group or a manufacturing group) of the platform instance.

The example technique 500 includes receiving 510 an override command. The override command may specify a portion (e.g., one or more a objects) of the configuration of the child application (e.g., child application A 380, child application B 382, child application C 384, or child application D 386) that was derived from the parent application (e.g., the parent application 370) and one or more new values to replace the value(s) derived from the parent application. For example the override command may have been generated by user using an application customization interface (e.g., including the example display region 710 of FIG. 7). For example, the override command may be received 510 by a platform instance (e.g., the platform instance 350) running on an application server (e.g., the application server 112) from a client device (e.g., the client 104). For example, the override command may be received 420 using a network interface (e.g., the network communication unit 218).

The example technique 500 includes overriding 520 a portion of the configuration of the child application that was derived from the parent application. For example, the portion (e.g., one or more objects) of the configuration may be overridden 520 responsive to the override command. In some implementations, a derived value of the portion is replaced by a new value for the portion in a copy of the portion stored with the configuration of the child application in a database (e.g. the database 118). Overriding 520 the portion of the configuration may change the operation of the child application relative to the parent application when the child application is invoked 460. For example, a platform instance (e.g., the platform instance 350) running on an application server (e.g., the application server 112) may override a portion of the configuration of the child application that was derived from the parent application (e.g., the parent application 370).

The example technique 500 includes receiving 530 a parent version command. The parent version command may specify a version of the parent application (e.g., the parent application 370) to be incorporated the child application (e.g., child application A 380, child application B 382, child application C 384, or child application D 386). For example the parent version command may have been generated by user using an application customization interface (e.g., including the example display region 710 of FIG. 7). For example, the parent version command may be received 530 by a platform instance (e.g., the platform instance 350) running on an application server (e.g., the application server 112) from a client device (e.g., the client 104). For example, the parent version command may be received 530 using a network interface (e.g., the network communication unit 218).

The example technique 500 includes assigning 540 a version of the parent application to the child application such that, when the parent application is updated, changes to a configuration of the parent application are prevented from propagating to the configuration of the child application. For example, a version of the parent application may be assigned 540 responsive to the parent version command. Normally, when a parent application (e.g., the parent application 370) is updated, the changes to the parent may be propagated to child applications (e.g., child application A 380, child application B 382, child application C 384, and child application D 386) that have been derived from the parent application. For example, the changes may be propagated automatically where configuration of a child application incorporates a configuration of the parent application by reference or the changes may be propagated by copying where a child application maintains a copy of a configuration of the parent application as part of the configuration of the child application. When a version of the parent has been assigned 540 to a child application, this propagation of the changes of the parent application to the child application is prevented. For example, a copy of the assigned 540 version of a configuration of the parent application may be made and a reference in the configuration of the child application may be updated to point to this versioned copy of the configuration of the parent application. For example, copying used to propagate changes to child applications may be prevented in the case of a child application that has an assigned 540 parent version. For example, a platform instance (e.g., the platform instance 350) may assign 540 a version of the parent application to the child application.

The example technique 500 includes receiving 550 a cross-scope data sharing command that specifies a set of data of the child application to be shared. For example the cross-scope data sharing command may have been generated by user using an application customization interface (e.g., including the example display region 710 of FIG. 7). For example, the cross-scope data sharing command may be received 510 by a platform instance (e.g., the platform instance 350) from a client device (e.g., the client 104). For example, the cross-scope data sharing command may be received 550 using a network interface (e.g., the network communication unit 218).

The example technique 500 includes allowing 560 the set of data to be accessed by one or more sibling applications (e.g., child application B 382, child application C 384, and/or child application D 386) that were generated via application extension from the same parent application (e.g., the parent application 370) as the child application (e.g., child application A 380). For example, access to the set of data may be allowed by merging an ACL of a sibling with an ACL of the child application and applying the resulting merged ACL to the specified set of data of the child application. For example, a platform instance (e.g., the platform instance 350) running on an application server (e.g., the application server 112) may allow 560 the set of data to be accessed by one or more sibling applications.

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. For example, the technique 500 may be augmented to include importing a configuration of a child application from a different platform instance for use in the platform instance. Values of the imported configuration may be used to configure the child application by adding to or replacing the configuration of the child application. For example, a configuration of a child application may be imported in an Extensible Markup Language (XML) format. Furthermore, one or more aspects of the systems and techniques described herein can be omitted.

Figure 6:
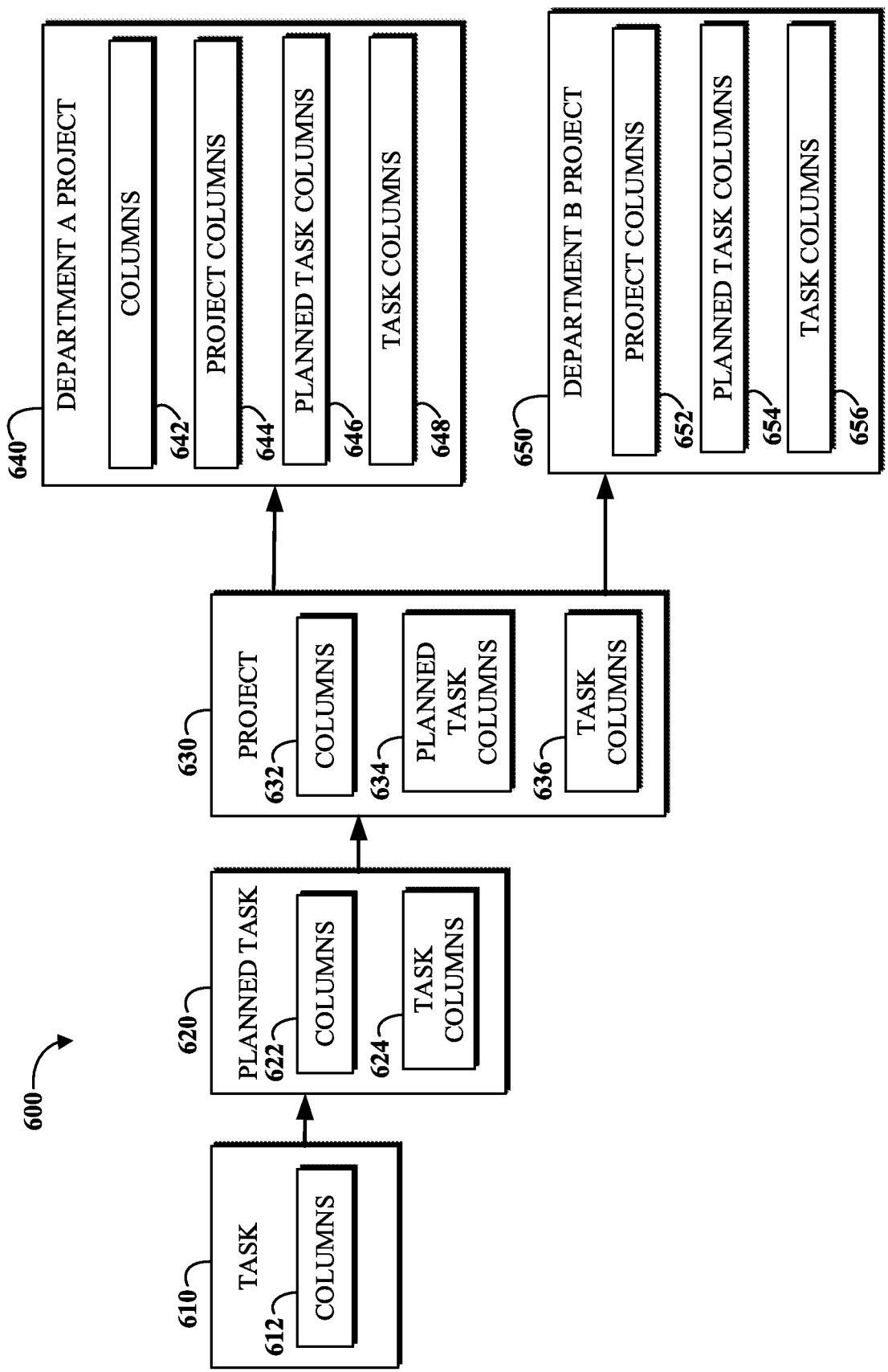
FIG. 6 is a block diagram of example applications generated using application extension.

FIG. 6 is a block diagram of example applications 600 generated using application extension. The task application 610 is the base object for this example set of application 600 related by application extension. The task application 610 has a configuration including the columns 612. The planned task application 620 is a child application that is derived from the task application 610. A configuration of the planned task application 620 includes task columns 624 that have been derived from the task application 610 and match the columns 612. The configuration of the planned task application 620 also includes additional columns, the columns 622, which may enable the planned task application 620 to perform functions specific to its use case(s). In some implementations, the task columns 624 may be a copy of the columns 612 that are stored in a table for the planned task application 620. In some implementations, the task columns 624 may be a reference (e.g., a pointer) to the columns 612 that are stored in a table for the task application 610.

The project application 630 is a child application that is derived from the planned task application 620. A configuration of the project application 630 includes task columns 636 that have been derived from the task application 610 via the planned task application 620 and match the columns 612 and the task columns 624. The configuration of the project application 630 also includes the planned task columns 634 that are derived from the planned task application 620 and match the columns 622. The configuration of the project application 630 also includes additional columns, the columns 632, which may enable the project application 620 to perform functions specific to its use case(s). In some implementations, the planned task columns 634 and the task columns 636 may be a copies, respectively, of the columns 622 and the task columns 624 that are stored in a table for the project application 630. In some implementations, the task columns 636 may be a reference (e.g., a pointer) to the columns 612 that stored are in a table for the task application 610, and the planned task columns 634 may be a reference (e.g., a pointer) to the columns 622 that are stored in a table for the planned task application 620.

The Department A project application 640 is a child application that is derived from the project application 630. A configuration of the Department A project application 640 includes task columns 648 that have been derived from the task application 610 via the planned task application 620 and the project application 630, and match the columns 612 and the task columns 624, and the task columns 636. The configuration of the Department A project application 640 also includes the planned task columns 646 that are derived from the planned task application 620 and the project application 630, and match the columns 622 and the planned task columns 634. The configuration of the Department A project application 640 also includes the project columns 644 that are derived from the project application 630, and match the columns 632. The configuration of the Department A project application 640 also includes additional columns, the columns 642, which may enable the Department A project application 620 to perform functions specific to its use case(s) (e.g., a use case of Department A). In some implementations, the project columns 644, the planned task columns 646, and the task columns 648 may be a copies, respectively, of the columns 632, the planned task columns 634, and the task columns 636 that are stored in a table for the Department A project application 640. In some implementations, the task columns 648 may be a reference (e.g., a pointer) to the columns 612 that stored are in a table for the task application 610, the planned task columns 646 may be a reference (e.g., a pointer) to the columns 622 that are stored in a table for the planned task application 620, and the project columns 644 may be a reference (e.g., a pointer) to the columns 632 that are stored in a table for the project application 630.

The Department B project application 650 is a child application that is derived from the project application 630. The Department A project application 640 is thus a sibling application of the Department B project application 650. A configuration of the Department B project application 650 includes task columns 656 that have been derived from the task application 610 via the planned task application 620 and the project application 630, and match the columns 612 and the task columns 624, and the task columns 636. The configuration of the Department B project application 650 also includes the planned task columns 654 that are derived from the planned task application 620 and the project application 630, and match the columns 622 and the planned task columns 634. The configuration of the Department B project application 650 also includes the project columns 652 that are derived from the project application 630, and match the columns 632. The configuration of the Department B project application 650 does not include additional columns. For example, the Department B project application 650 may have been generated as starting point for future customization and/or to facilitate private scoping of application data for Department B. In some implementations, the project columns 652, the planned task columns 654, and the task columns 656 may be a copies, respectively, of the columns 632, the planned task columns 634, and the task columns 636 that are stored in a table for the Department B project application 650. In some implementations, the task columns 656 may be a reference (e.g., a pointer) to the columns 612 that stored are in a table for the task application 610, the planned task columns 654 may be a reference (e.g., a pointer) to the columns 622 that are stored in a table for the planned task application 620, and the project columns 652 may be a reference (e.g., a pointer) to the columns 632 that are stored in a table for the project application 630.

Figure 7:
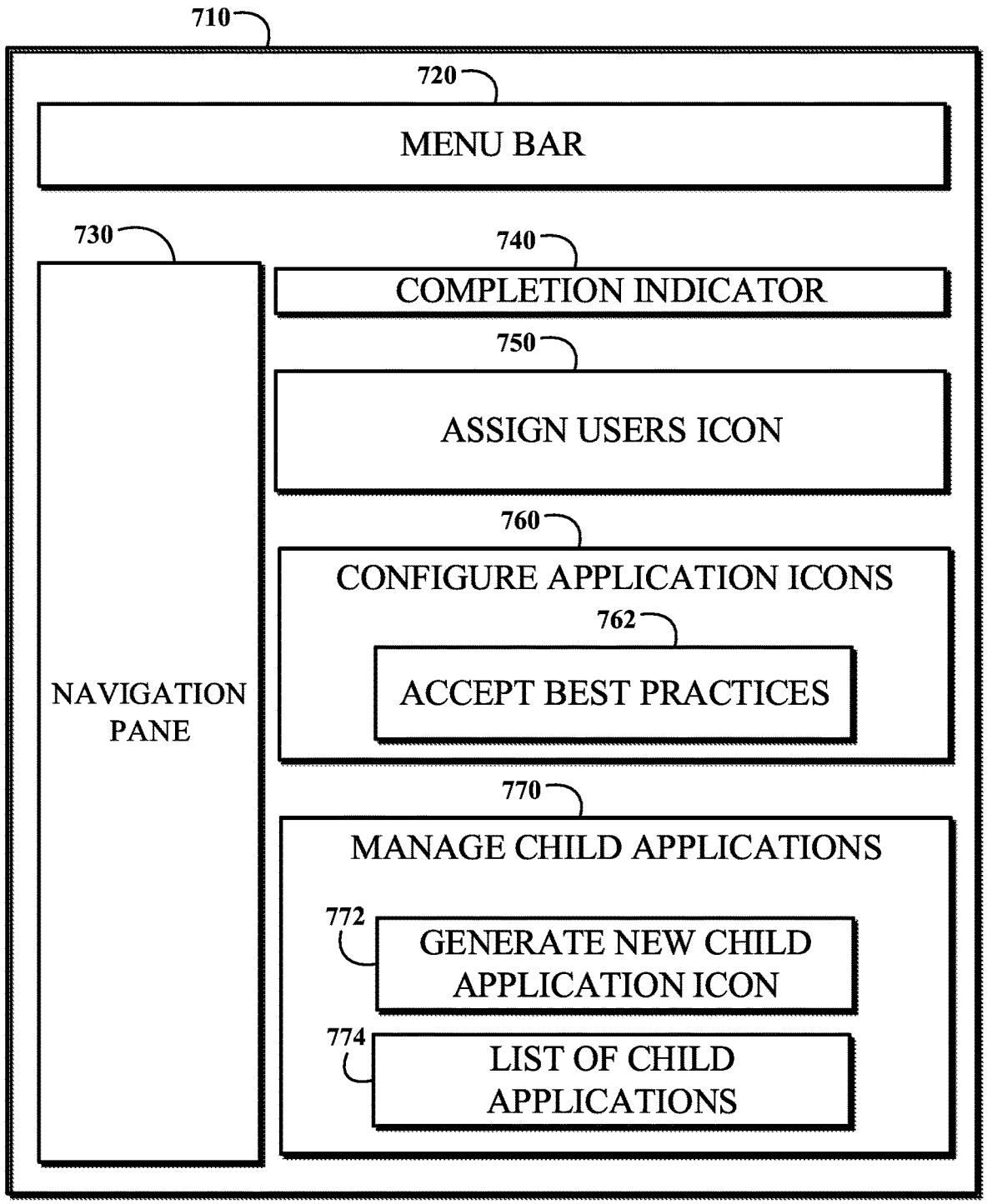
FIG. 7 is a diagram of an example display region generated for generating and configuring applications.

FIG. 7 is a diagram of an example display region 710 generated for generating and configuring applications. The display region 710 may be part of an application customization interface that can be used to generate configuration commands to be sent to a platform instance. The display region 710 includes a menu bar 720; a navigation pane 730; a completion indicator 740; an assign users icon 750; configure application icons 760, including an accept best practices icon 762; and manage child applications tab 770, including a generate new child application icon 772 and a list of child applications 774. For example, the display region 710 may be generated by a platform instance (e.g., the platform instance 350) running on an application server (e.g., the application server 112) and transmitted to a client device (e.g., the client 104 of FIG. 1) where it is presented in a user interface (e.g., the user interface 220 of FIG. 2).

The menu bar 720 may include a user icon reflecting the status of a currently logged in user, a search icon, a chat icon, a help icon, a setup icon, and an options icon. The navigation pane 730 may include a search box, a favorites icon, and a site map or tree. The completion indicator 740 may display the percentage of completed tasks in a guided setup and configuration of a platform instance or an application of a platform instance. The completion indicator 740 may also list tasks of the guided setup with indication as to the completion status of each listed task. The assign users icon 750 may enable a user (e.g., an administrator) performing a guided setup to assign tasks to other administrators. All tasks in the category can be assigned to a single admin or each can be assigned individually. A pop-up or pull-down list may display users with the administrator role. When a task is assigned the selected administrator may receive an email if their user record contains an email address.

The configure application icons section 760 includes information about a configuration of an application provided by the platform software that is currently being configured. The configure application icons section 760 includes an accept best practices icon 762 that enables a user to accept the default configurations and mark the selected items as complete with a single click. When you point to this component the status icons for the effected tasks change to show what will be marked complete. The configure application icons section 760 may also include icons for configuring individual aspects of an application corresponding to tasks in a guided setup, mark configuration tasks as complete, and add notes about a configuration choice corresponding to a task in the guided setup.

The manage child applications tab 770 facilitates the setup and maintenance of multiple child applications for an out-of-box application of the platform instance, or an existing child application, that is being configured in the guided setup. The manage child applications tab 770 includes the generate new child application icon 772 that, when selected enables a user to generate one or more commands for transmission to the platform instance to cause the platform instance to generate a child application via application extension from the application being configured (e.g., using the technique 400 of FIG. 4 or the technique 800 of FIG. 8). The manage child applications tab 770 also includes the list of child applications for the current application that enables a user to review and select a child application for additional configuration in an application customization interface for the child application that includes the a version of the display region 710. In this manner a user may cause child applications to be generated and configured by the platform instance without changing the configuration of the parent application.

Figure 8:
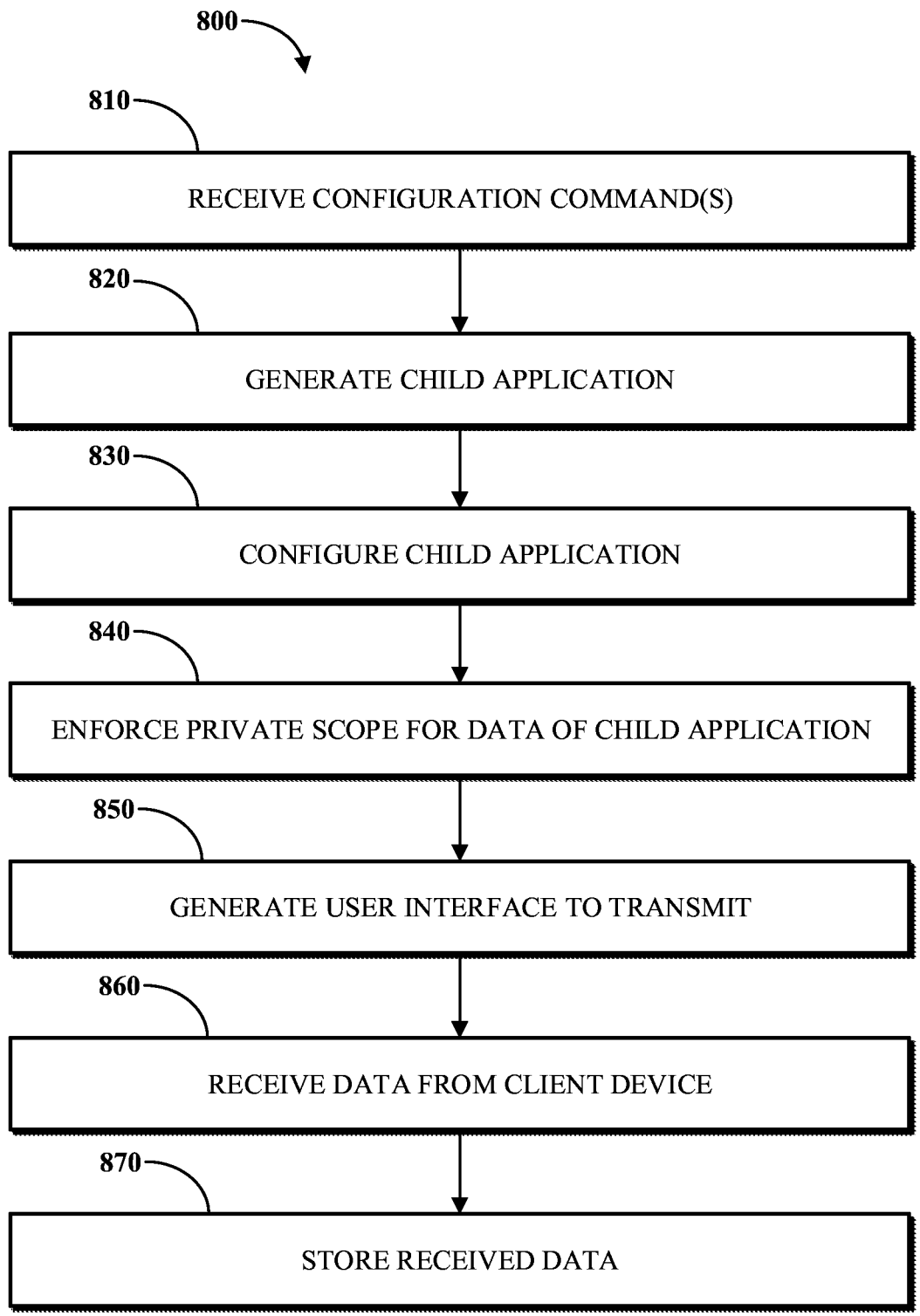
FIG. 8 is a logic flowchart illustrating an example of a technique for providing software services with a platform instance using application extension.

FIG. 8 is a logic flowchart illustrating an example of a technique 800 for providing software services with a platform instance using application extension in an electronic computing and communications system, such as the system 100 as generally illustrated in FIG. 1. In some implementations, the technique 800 can be executed using computing devices, such as the systems, modules, and devices described with respect to FIGS. 1, 2, and 3A. In some implementations, the technique 800 can be performed, for example, by executing a machine-readable program or other computer-executable instructions, such as instructions or programs described according to JavaScript, C, or other such instructions. The steps, or operations, of the technique 800 or any other technique, method, process, or algorithm described in connection with the implementations disclosed herein can be implemented directly in hardware, firmware, software executed by hardware, circuitry, or a combination thereof.

The example technique 800 includes receiving 810 one or more configuration commands from a client device to extend a parent application included in an instance of platform software; based on the one or more configuration commands, generating 820 a child application extending the parent application, wherein the child application includes a child configuration and wherein the child application uses both the parent configuration and the child configuration; configuring 830 the child application; enforcing 840 private scope for data of the child application; generating 850 a user interface to transmit to the client device using at least some of the parent configuration and at least some of the child configuration; receiving 860 data from the client device generated using the user interface; and storing 870 the received data using at least some of a plurality of parent application fields and at least some of a plurality of child application fields. For example, the technique 800 may be implemented by a platform software (e.g., platform instance 350 of FIG. 3C) running on an application server (e.g., the application server 112). In some implementations, the technique 800 may enable supporting multiple configurations of an application (e.g., the child applications 380, 382, 384, and 386) that can evolve independently to support multiple use cases within an organization while allowing users of these multiple configurations of the application to continue accessing the shared data (e.g., the shared data 360) of a platform instance.

The example technique 800 includes receiving 810 one or more configuration commands from a client device (e.g., the client 104) to extend a parent application included in an instance of platform software. The parent application may include a parent configuration that defines operation of the parent application when invoked using the platform software. For example, the one or more configuration commands may have been generated by the user using an application customization interface (e.g., including the display region 710 of FIG. 7). For example, the one or more configuration commands may identify a parent application (e.g., the parent application 370) and instruct a platform software (e.g., the platform instance 350) to generate 820 a child application (e.g., child application A 380, child application B 382, child application C 384, and/or child application D 386) extending the parent application. For example, the one or more configuration commands may be received 810 by a platform software (e.g., the platform instance 350) running on an application server (e.g., the application server 112) from a client device (e.g., the client 104). For example, the one or more configuration commands may be received 810 using a network interface (e.g., the network communication unit 218).

The example technique 800 includes generating 820 a child application (e.g., child application A 380, child application B 382, child application C 384, or child application D 386) extending the parent application (e.g., the parent application 370). The child application may be generated 820 based on (e.g., responsive to) the one or more configuration commands received 810. The child application may include a child configuration and the child application may use both the parent configuration and the child configuration. In some implementations, table extensions are used to generate 820 a child application extending the parent application. For example, the child configuration may be stored in an extensible table in a database (e.g., the database 118). For example, a configuration of an application may include various types of data stored in objects (e.g., fields or columns of a table) for the application, such as integers, text, choices, references, business rules, user interface actions, workflow, logic, JavaScript, etc. In some implementations, generating 820 a child application includes setting an extended table attribute, the super_class, of the configuration object (or table) to an existing configuration object (or table) of the parent application. Additional objects (e.g., fields and/or application logic) specific to the child application may be added to the configuration of the child application. For example, a platform software (e.g., the platform instance 350) running on an application server (e.g., the application server 112) may generate 820 the child application, including storing the child configuration in a database of the platform software (e.g., the database 118).

The example technique 800 includes configuring 830 the child application. For example, the configuration of the child application can be added or modified upon generation of the child application and/or afterwards in response to configuration commands for customizing the child application to suit a potentially evolving use case (e.g., a use case of a sub-organization within a larger organization of a customer). For example, the technique 500 of FIG. 5 may be implemented to configure 830 the child application (e.g., child application A 380, child application B 382, child application C 384, or child application D 386).

The example technique 800 includes enforcing 840 a private scope for data of the child application (e.g., child application A 380, child application B 382, child application C 384, or child application D 386). Enforcing 840 a private scope for a set of data of the child application may prevent the set of data from being accessed or modified by sibling applications that have been generated based on the parent application. For example, the set of data may include the child configuration. In some implementations, enforcing 840 the private scope for the set of data includes storing the set of data (e.g., the configuration) in a database of the platform software, maintaining an access control list (ACL) for the set of data (e.g., the configuration), and utilizing the ACL to control access to the set of data (e.g., the configuration). For example, a platform software (e.g., the platform instance 350) running on an application server (e.g., the application server 112) may enforce 840 a private scope for a set of data of the child application.

The example technique 800 includes generating 850 a user interface to transmit to the client device (e.g., the client 104) using at least some of the parent configuration and at least some of the child configuration. In some implementations, the platform software is a multi-tenant instance that segregates data for multiple customers using domain separation. For example, the user interface may be generated 850 by a platform software (e.g., the platform instance 350) running on an application server (e.g., the application server 112) responsive to a request received by the application server from a client device (e.g., the client 104). The child configuration may cause the child application to operate in a manner that is tailored to a use case (e.g., a use case for a sub-organization or business unit) when generating 850 the user interface to transmit to the client device.

The example technique 800 includes receiving 860 data from the client device (e.g., the client 104) generated using the user interface. For example, the received 860 data may include customer data that will be stored as shared data (e.g., in the shared data 360) or privately scoped application data of the child application. For example, the data may be received 860 by a platform software (e.g., the platform instance 350) running on an application server (e.g., the application server 112) from a client device (e.g., the client 104). For example, the data may be received 860 using a network interface (e.g., the network communication unit 218).

For example, the parent application may include a plurality of parent application fields and the child application may include a plurality of child application fields. The example technique 800 includes storing 870 the received 860 data using at least some of the plurality of parent application fields and at least some of the plurality of child application fields. For example, a platform software (e.g., the platform instance 350) running on an application server (e.g., the application server 112) may store 870 the received data in a database (e.g., the database 118).

Although the technique 800 is shown as a series of operations for clarity, implementations of the technique 800 or any other technique, process, or algorithm described in connection with the implementations disclosed herein can be performed in various orders or concurrently. Additionally, operations in accordance with this disclosure can be performed with other operations not presented and described herein. For example, the technique 800 may be augmented to include exporting the child configuration for use in a different instance of platform software. For example, a child configuration may be exported in an Extensible Markup Language (XML) format. Furthermore, one or more aspects of the systems and techniques described herein can be omitted. For example, storing 870 the received data using at least some of the plurality of parent application fields and at least some of the plurality of child application fields, configuring 830 the child application, and/or enforcing 840 private scope for data of a child application are operations that may be omitted.

Figure 9:
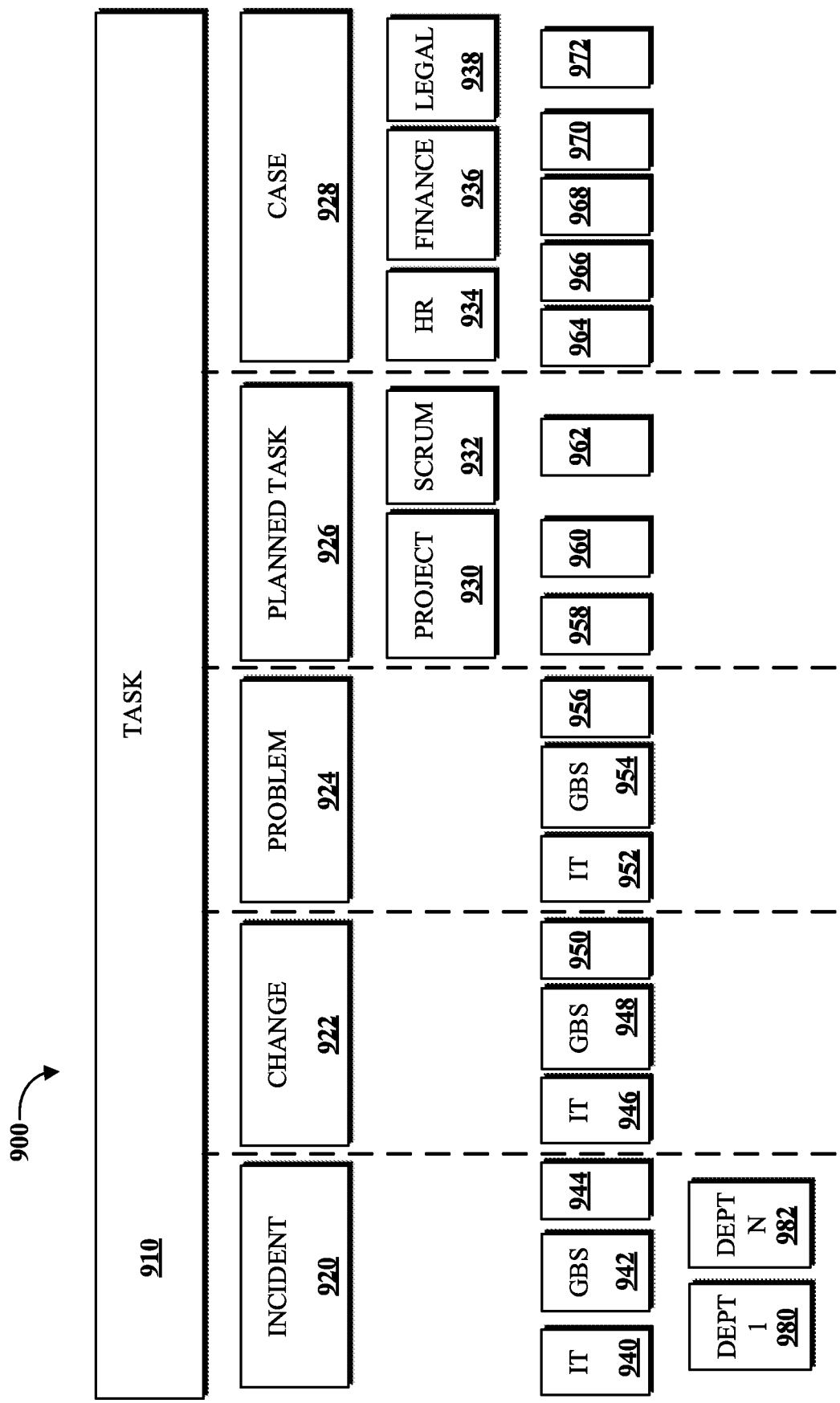
FIG. 9 is a diagram of an example application extension taxonomy.

FIG. 9 is a diagram of an example of an application extension taxonomy 900. The example taxonomy 900 includes a set of out-of-box globally scoped applications. The out-of-box globally scoped applications include Task 910, which is the root source and a component of all the applications in the application extension taxonomy 900. The out-of-box globally scoped applications include incident 920, change 922, problem 924, planned task 926, and case 928, which all are derived directly from task 910. The out-of-box globally scoped applications include project 930 and scrum 932, which are derived from planned task 926. The out-of-box globally scoped applications include HR 934, finance 936, and legal 938, which are derived from case 928.

The example taxonomy 900 has also been extended by users using application extension to include a set of custom private scoped applications. The custom private scoped applications include applications 940, 942, and 944, which are derived from incident 920. The custom private scoped applications include applications 946, 948, and 950, which are derived from change 922. The custom private scoped applications include applications 952, 954, and 956, which are derived from problem 924. The custom private scoped applications include applications 958 and 960, which are derived from project 930. The custom private scoped applications include application 962, which is derived from scrum 932. The custom private scoped applications include applications 964 and 966, which are derived from HR 934. The custom private scoped applications include applications 968 and 970, which are derived from finance 936. The custom private scoped applications include application 972, which is derived from legal 938. The custom private scoped applications include Department 1 application 980 and Department 2 application 982, which are derived from application 942. Considerations for designing an application extension taxonomy such as the taxonomy 900 include: placement of new data in hierarchy; handling shared objects (e.g., priority); owners for each area; balance autonomy of service domains with enterprise reporting; process implications; and user experience.

Figure 10:
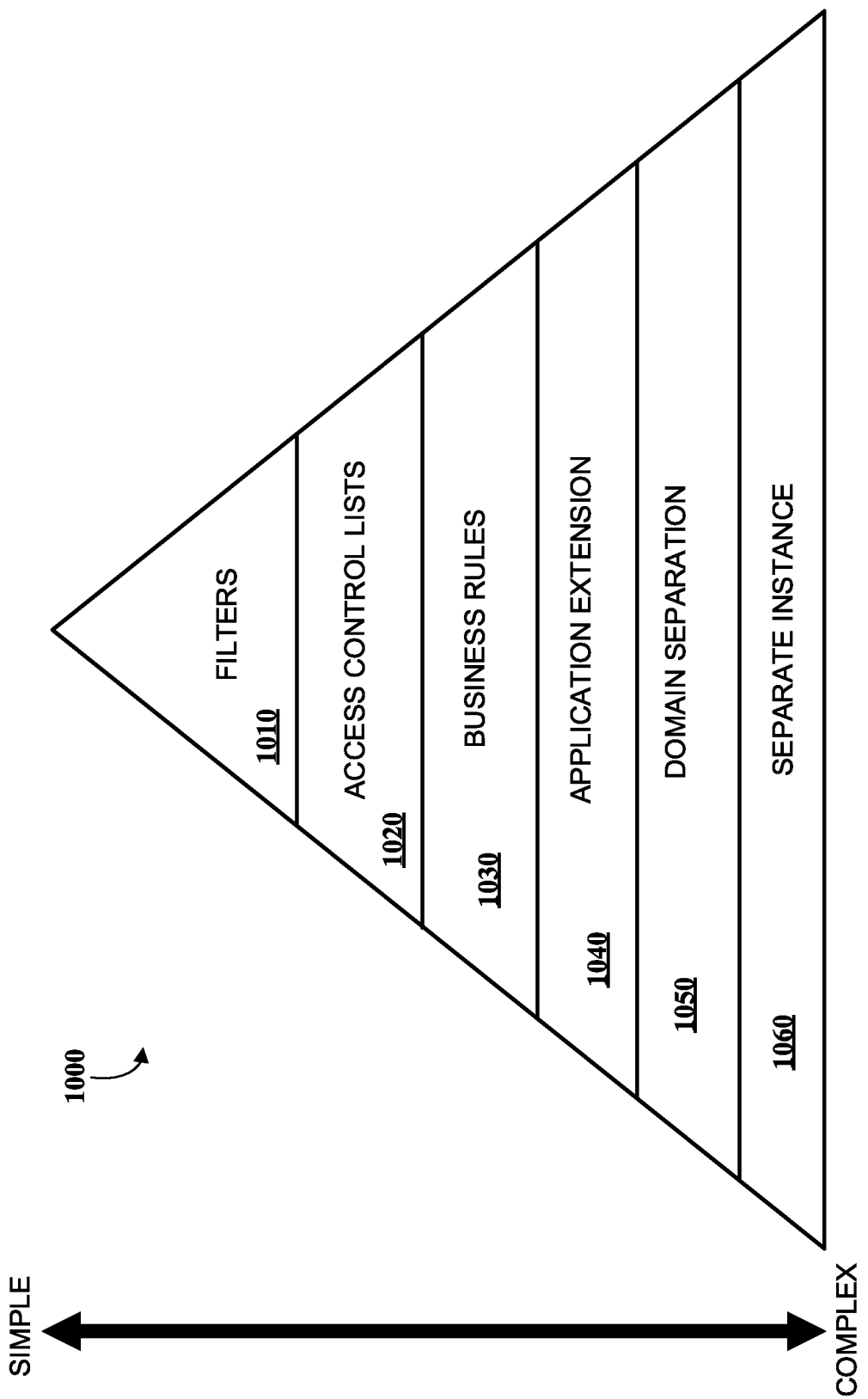
FIG. 10 is a diagram of tools for application security and data segregation.

FIG. 10 is a diagram of tools 1000 for application security and data segregation. The application security and data segregation tools are arranged in a pyramid, from least complex at the top to most complex at the wide bottom of the pyramid. The simplest tool may be filters 1010, which limits records access with a predefined query. The next level of complexity is access control lists 1020, which may be used for company or departmental data separation. The next level of complexity is business rules 1030, which may filter data based on content. The next level of complexity is application extension 1040 which may enable groups in a same company to share data, using the same application configured with multiple use-cases. The next level of complexity is domain separation 1050, which performs data segregation and may enable support for managed service providers or independent legal entities. The next level of complexity is using separate instance 1060, which may be recommended in case of divestiture.

Figure 11:
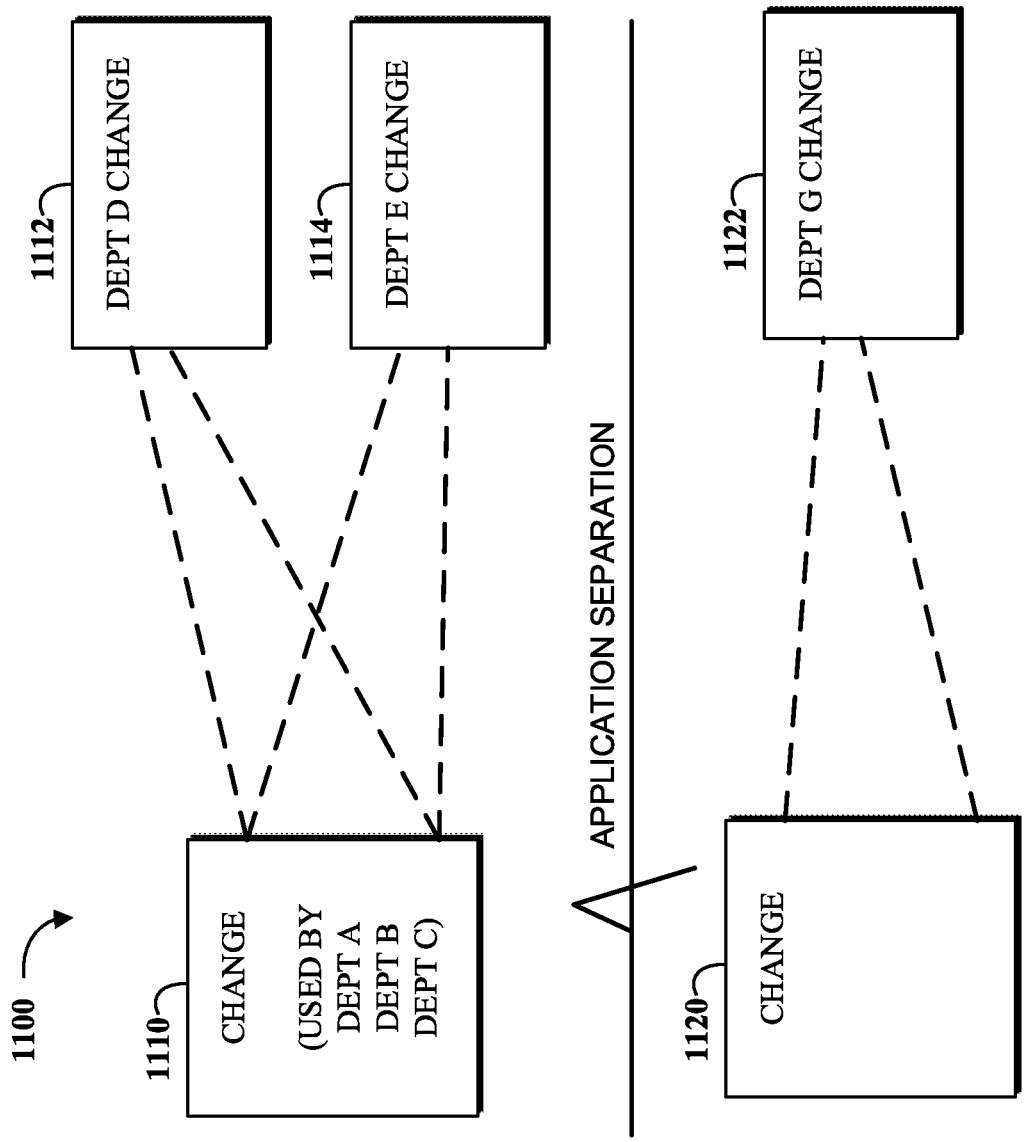
FIG. 11 is a diagram of an example table hierarchy.

FIG. 11 is a diagram of an example of a table hierarchy 1100. Out-of-box applications such as a change management application, may be extended for security or for department specific requirements. The table hierarchy 1100 may: enforce security of configuration changes; derive parent processes and fields; allow additional department or business unit specific data; supports process deviation; allow for segregated data within the system (for reporting/viewing/security/etc.); processes deviation may be made with total application and process isolation; scope may be extended for department specific requirements; supports unique process, secure access, and separated management; create segregated data within the system (for reporting/viewing/security/etc.), while allowing parent level reporting if security allowed; and support for department specific development environments.

The table hierarchy 1100 includes an out-of-box change application 1110 that is used by three groups (Departments A, B, and C) and is a parent application for two child applications—Department D change 1112 and Department E change 1114. These child applications may be customized to address the use cases of their respective groups. Department D change 1112 has been extended to address unique requirements and Department E change 1114 has been extended to accommodate a process exception. The table hierarchy 1100 includes a second copy of the change application 1120 that separated from the from the first using application separation (e.g., domain separation). A child application, Department G change 1122, has been generated that is derived from the change application 1120 to address a specific use case in a data secured environment.

An implementation of this disclosure is a system for providing software services. The system includes a means for transmitting to a client device an application customization interface for presentation to a user; a means for receiving one or more configuration commands from the client device, where the one or more configuration commands have been generated by the user using the application customization interface; a means for based on the one or more configuration commands, generating a child application based on a parent application, where a configuration of the child application includes objects derived from the parent application via application extension; and a means for invoking the child application using a platform instance to access customer data stored by the platform instance.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

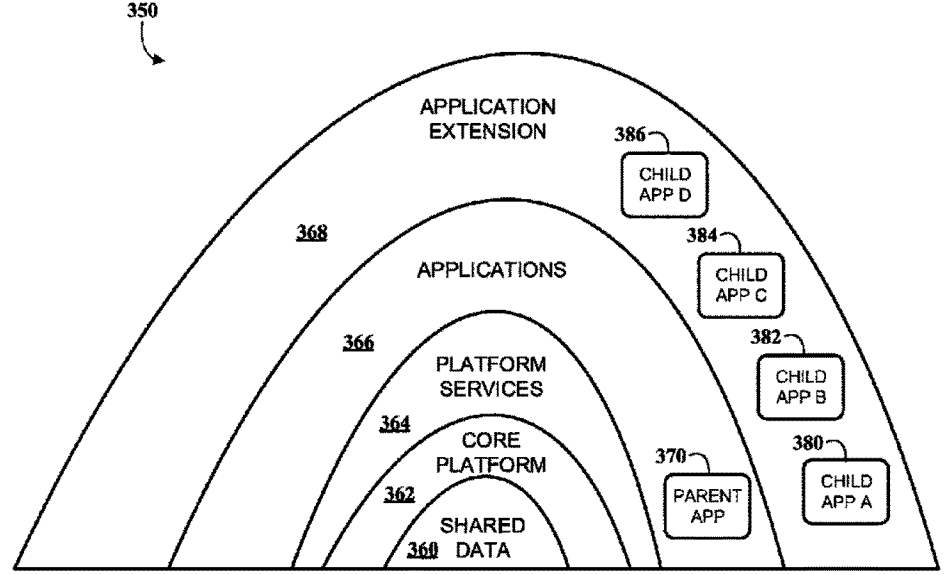

What is claimed is:

1. A system operable to provide software services, the system comprising:
   a memory; and
   a processor, wherein the memory includes instructions executable by the processor to cause the system to:

transmit to a client device to an application customization interface for presentation to a user;

receive one or more configuration commands from the client device, wherein the one or more configuration commands have been generated by the user using the application customization interface;

based on the one or more configuration commands, generate a child application based on a parent application, wherein a configuration of the child application includes objects derived from the parent application via application extension;

receive a command that identifies a particular configuration of the parent application;

responsive to receiving the command, assign the particular configuration of the parent application to the child application such that, when the particular configuration of the parent application is updated to a new configuration of the parent application, one or more changes to the particular configuration of the parent application to generate the new configuration of the parent application are prevented from propagating to the configuration of the child application; and invoke the child application using a platform instance to access customer data stored by the platform instance.

2. The system of claim 1, wherein the memory includes instructions executable by the processor to cause the system to:

receive an override command; and responsive to the override command, override a portion of the configuration of the child application that was derived from the parent application.

3. The system of claim 1, wherein the memory includes instructions executable by the processor to cause the system to:

enforce a private scope for a first set of data of the child application that prevents the first set of data from being accessed or modified by sibling applications that have been derived via application extension from the parent application.

4. The system of claim 3, wherein the first set of data includes the configuration of the child application.

5. The system of claim 3, wherein the instructions for enforcing the private scope include instructions executable by the processor to cause the system to:

store the configuration of the child application in a database of the platform instance;

maintain an access control list for the configuration of the child application; and utilize the access control list to control access to the configuration of the child application.

6. The system of claim 3, wherein the memory includes instructions executable by the processor to cause the system to:

receive a cross-scope data sharing command that specifies a second set of data of the child application; and allow the second set of data to be accessed by one or more of the sibling applications.

7. The system of claim 1, wherein the platform instance is a multi-tenant instance that segregates data for multiple customers using domain separation.

8. The system of claim 1, wherein the configuration is stored in an extensible table in a database.

9. The system of claim 1, wherein a table hierarchy comprises the parent application, the child application, and a copy of the parent application separated from the parent application and the child application via domain separation.

10. A method for providing software services, the method comprising:

transmitting to a client device an application customization interface for presentation to a user;

receiving one or more configuration commands from the client device, wherein the one or more configuration commands have been generated by the user using the application customization interface;

based on the one or more configuration commands, generating a child application based on a parent application, wherein a configuration of the child application includes objects derived from the parent application via application extension;

receiving a command that identifies a particular configuration of the parent application;

responsive to receiving the command, assigning the particular configuration of the parent application to the child application such that, when the particular configuration of the parent application is updated to a new configuration of the parent application, one or more changes to the particular configuration of the parent application to generate the new configuration of the parent application are prevented from propagating to the configuration of the child application; and invoking the child application using a platform instance to access customer data stored by the platform instance.

11. The method of claim 10, wherein the child application is a first child application and comprising:

generating a second child application based on the first child application, wherein a configuration of the second child application includes objects derived from the first child application and from the parent application via application extension; and invoking the second child application using the platform instance to access customer data stored by the platform instance.

12. A system operable to provide software services, the system comprising:

a memory; and a processor, wherein the memory includes instructions executable by the processor to cause the system to:

receive one or more configuration commands from a client device to extend a parent application included in an instance of platform software, wherein the instance of the platform software includes a copy of the parent application separated from the parent application via domain separation, wherein a configuration of the parent application defines operation of the parent application when invoked using the platform software and a configuration of the copy of the parent application defines operation of the copy of the parent application when invoked using the platform software;

based on the one or more configuration commands, generate a child application based on extension of the parent application, wherein a configuration of the child application includes the configuration of the parent application;

receive a command that identifies a particular configuration of the parent application;

responsive to receiving the command, assign the particular configuration of the parent application to the child application such that, when the particular configuration of the parent application is updated to a new configuration of the parent application, one or more changes to the particular configuration of the parent application to generate the new configuration of the parent application are prevented from propagating to the configuration of the child application;

generate a user interface based on the configuration of the child application, wherein the user interface is transmitted to the client device;

receive one or more additional configuration commands from an additional client device to extend the copy of the parent application;

based on the one or more additional configuration commands, generate an additional child application based on extension of the copy of the parent application, wherein a configuration of the additional child application includes the configuration of the copy of the parent application; and generate an additional user interface based on the configuration of the additional child application, wherein the user interface is transmitted to the additional client device.

13. The system of claim 12, wherein the parent application includes a plurality of parent application fields and the child application includes a plurality of child application fields, wherein the memory includes instructions executable by the processor to cause the system to:

receive data from the client device generated using the user interface; and store the received data using at least some of the plurality of parent application fields and at least some of the plurality of child application fields.

14. The system of claim 12, wherein the memory includes instructions executable by the processor to cause the system to:

export the configuration of the child application for use in a different instance of the platform software.

15. The system of claim 12, wherein the memory includes instructions executable by the processor to cause the system to:

receive an override command; and responsive to the override command, override a portion of the configuration of the parent application.

16. The system of claim 12, wherein the memory includes instructions executable by the processor to cause the system to:

enforce a private scope for a first set of data of the child application that prevents the first set of data from being accessed or modified by sibling applications that have been generated based on the parent application.

17. The system of claim 16, wherein the instructions for enforcing the private scope include instructions executable by the processor to cause the system to:

store the first set of data in a database of the instance of the platform software;

maintain an access control list for the first set of data; and utilize the access control list to control access to the first set of data.

18. The system of claim 16, wherein the memory includes instructions executable by the processor to cause the system to:

receive a cross-scope data sharing command that specifies a second set of data of the child application; and allow the second set of data to be accessed by one or more of the sibling applications.

19. The system of claim 12, wherein the instance of the platform software is a multi-tenant instance that segregates data between at least a first enterprise associated with the parent application and a second enterprise associated with the copy of the parent application using domain separation.

20. The system of claim 12, wherein the configuration of the child application is stored in an extensible table in a database.

* * * * *

UNITED STATES PATENT AND TRADEMARK OFFICE
CERTIFICATE OF CORRECTION

PATENT NO.       : 10,817,492 B2
APPLICATION NO.  : 15/588101
DATED            : October 27, 2020
INVENTOR(S)      : Jacob Samuel Burman and Michael Alan Jones It is certified that error appears in the above-identified patent and that said Letters Patent is hereby corrected as shown below:

On the Title Page

Please delete the Title Page and insert the attached Title Page showing the corrected number of claims.

In the Claims

Column 32, Line 35, please insert missing Claim 21:
-- 21 The method of claim 1, wherein evaluating the intermediate representation comprises determining that the first predicate does not match a value of the information element before the modification of the information element by the data operation and matches the value of the information element after the modification of the information by the data operation, and wherein the change type is determined as enter. --.

Signed and Sealed this
Thirtieth Day of August, 2022

Katherine Kelly Vidal
*Director of the United States Patent and Trademark Office*

CERTIFICATE OF CORRECTION (continued)

(12) United States Patent
Burman et al.

(10) Patent No.: US 10,817,492 B2
(45) Date of Patent: Oct. 27, 2020

(54) APPLICATION EXTENSION

(71) Applicant: ServiceNow, Inc., Santa Clara, CA (US)

(72) Inventors: Jacob Samuel Burman, Savage, MN (US); Michael Alan Jones, Glen Carbon, IL (US)

(73) Assignee: ServiceNow, Inc., Santa Clara, CA (US)

( * ) Notice: Subject to any disclaimer, the term of this patent is extended or adjusted under 35 U.S.C. 154(b) by 323 days.

(21) Appl. No.: 15/588,101

(22) Filed: May 5, 2017

(65) Prior Publication Data
US 2018/0321820 A1  Nov. 8, 2018

(51) Int. Cl.
*G06F 16/22* (2019.01)
(52) U.S. Cl.
CPC .................. *G06F 16/2282* (2019.01)
(58) Field of Classification Search
None
See application file for complete search history.

(56) References Cited

U.S. PATENT DOCUMENTS

| | | | |
|---|---|---|---|
| 5,446,575 A * | 8/1995 | Lysakowski, Jr. | .... G06F 16/258 |
| 6,321,229 B1 | 11/2001 | Goldman | |
| 6,678,887 B1 | 1/2004 | Hallman | |
| 7,020,706 B2 | 3/2006 | Cates | |
| 7,603,657 B2 * | 10/2009 | Gassner | .................. G06F 9/06 |
| | | | 717/113 |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |

(Continued)

FOREIGN PATENT DOCUMENTS

| | | | |
|---|---|---|---|
| EP | 2 523 134 A1 * | 11/2012 | ............ G06F 19/00 |
| EP | 2523134 A1 * | 11/2012 | ............ G16H 10/40 |

OTHER PUBLICATIONS

PHPenthusiast, "Inheritance in object-oriented PHP", 2016, Published at https://phpenthusiast.com/object-oriented-php-tutorials/inheritance-in-object-oriented-php (Year: 2016).*

(Continued)

*Primary Examiner* — Hossain M Morshed
(74) *Attorney, Agent, or Firm* — Fletcher Yoder PC

(57) ABSTRACT

Systems and methods are disclosed for providing customized applications from platform software using application extension. For example, methods may include transmitting to a client device an application customization interface for presentation to a user; receiving one or more configuration commands from the client device, where the one or more configuration commands have been generated by the user using the application customization interface; based on the one or more configuration commands, generating a child application based on a parent application, where a configuration of the child application includes objects derived from the parent application via application extension; and invoking the child application using a platform instance to access customer data stored by the platform instance.

21 Claims, 13 Drawing Sheets